(12) United States Patent
Guo et al.

(10) Patent No.: US 11,237,896 B2
(45) Date of Patent: Feb. 1, 2022

(54) DISTRIBUTED SYSTEM, MESSAGE PROCESSING METHOD, NODES, CLIENT, AND STORAGE MEDIUM

(71) Applicant: TENCENT TECHNOLOGY (SHENZHEN) COMPANY LIMITED, Shenzhen (CN)

(72) Inventors: Rui Guo, Shenzhen (CN); Maocai Li, Shenzhen (CN); Qi Zhao, Shenzhen (CN); Jianjun Zhang, Shenzhen (CN); Haitao Tu, Shenzhen (CN); Zongyou Wang, Shenzhen (CN); Jun Liang, Shenzhen (CN); Dawei Zhu, Shenzhen (CN); Lisheng Chen, Shenzhen (CN); Binhua Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 187 days.

(21) Appl. No.: 16/383,162

(22) Filed: Apr. 12, 2019

(65) Prior Publication Data
US 2019/0235946 A1 Aug. 1, 2019

Related U.S. Application Data

(63) Continuation of application No. PCT/CN2018/080574, filed on Mar. 26, 2018.

(30) Foreign Application Priority Data

Mar. 30, 2017 (CN) .......................... 201710203499.X

(51) Int. Cl.
  *G06F 11/00* (2006.01)
  *G06F 11/07* (2006.01)
  (Continued)

(52) U.S. Cl.
  CPC ........ *G06F 11/079* (2013.01); *G06F 11/0709* (2013.01); *G06F 11/0751* (2013.01);
  (Continued)

(58) Field of Classification Search
  CPC ............. G06F 11/2094; G06F 11/0793; G06F 11/1076
  See application file for complete search history.

(56) References Cited

U.S. PATENT DOCUMENTS 6,657,242 B1 * 12/2003 Norstrom .......... H01L 21/76224
                                              257/197
7,630,944 B2 * 12/2009 Rupp ..................... G06Q 10/10
                                              706/20

(Continued)

FOREIGN PATENT DOCUMENTS

CN        106060036 A       10/2016
CN        106503589 A        3/2017
(Continued)

OTHER PUBLICATIONS

Korean Office Action dated Aug. 27, 2020 in Korean Patent Application No. 10-2019-7027223, citing document AX therein, 8 pages.
(Continued)

*Primary Examiner* — Amine Riad
(74) *Attorney, Agent, or Firm* — Oblon, McClelland, Maier & Neustadt, L.L.P.

(57) ABSTRACT

The present disclosure discloses a distributed system and a message processing method. The distributed system includes a client and a plurality of nodes. The client includes processing circuitry that is configured to send a message including a digital signature of the client. The distributed system is in a first consensus mode for reaching a consensus on the message. The processing circuitry obtains results from a subset of the nodes that receive the message. The (Continued)

results have respective digital signatures of the subset of the nodes. After verifying the digital signatures of the subset of the nodes, the processing circuitry of the client determines, based on the results, whether one or more of the nodes in the distributed system is malfunctioned.

20 Claims, 11 Drawing Sheets

(51) Int. Cl.
*G06F 11/20* (2006.01)
*H04L 29/06* (2006.01)
*H04L 9/32* (2006.01)
*H04L 12/26* (2006.01)
*G06F 21/00* (2013.01)
*H04L 29/08* (2006.01)
*H04L 9/30* (2006.01)

(52) U.S. Cl.
CPC .......... *G06F 11/2023* (2013.01); *G06F 21/00* (2013.01); *H04L 9/3242* (2013.01); *H04L 9/3247* (2013.01); *H04L 43/0847* (2013.01); *H04L 63/0442* (2013.01); *H04L 63/123* (2013.01); *H04L 67/1097* (2013.01); *H04L 9/30* (2013.01); *H04L 2209/38* (2013.01)

(56) References Cited

U.S. PATENT DOCUMENTS

| | | | | |
|---|---|---|---|---|
| 7,937,482 | B1* | 5/2011 | Vermeulen | H04L 67/1095 709/229 |
| 8,856,593 | B2* | 10/2014 | Eckhardt | G06F 11/2028 714/20 |
| 8,918,392 | B1 | 12/2014 | Brooker et al. | |
| 9,690,675 | B2* | 6/2017 | Madduri | H04L 41/12 |
| 10,657,012 | B2* | 5/2020 | Madduri | H04L 67/10 |
| 10,803,052 | B2* | 10/2020 | Yang | G06F 11/183 |
| 2017/0270176 | A1* | 9/2017 | Horowitz | G06F 11/2094 |
| 2017/0344443 | A1* | 11/2017 | Madduri | H04L 69/40 |
| 2018/0302217 | A1* | 10/2018 | Hevia Angulo | H04L 63/0442 |
| 2019/0025177 | A1* | 1/2019 | Steen | G06T 7/0004 |
| 2019/0258646 | A1* | 8/2019 | Chen | G06F 16/273 |
| 2019/0294514 | A1* | 9/2019 | Tang | H04L 63/10 |
| 2019/0306173 | A1* | 10/2019 | Reddy | H04L 63/126 |
| 2019/0324867 | A1* | 10/2019 | Tang | G06F 16/27 |
| 2020/0313858 | A1* | 10/2020 | Feng | H04L 9/3239 |
| 2020/0379852 | A1* | 12/2020 | Yang | G06F 9/4401 |
| 2020/0396081 | A1* | 12/2020 | Ansel | H04L 9/3236 |
| 2020/0403776 | A1* | 12/2020 | Oh | H04L 9/3239 |
| 2021/0097537 | A1* | 4/2021 | Guo | G06Q 20/3827 |

FOREIGN PATENT DOCUMENTS

| | | |
|---|---|---|
| CN | 106534273 A | 3/2017 |
| CN | 106789095 A | 5/2017 |
| JP | 2015-057692 A | 3/2015 |
| JP | 2016-517605 A | 6/2016 |

OTHER PUBLICATIONS

Marco Platania et al., "On Choosing Server- or Client-Side Solutions for BFT", ACM Computing Surveys, vol. 48, No. 4, Article 61, Mar. 2016, 61:-61:30, 30 pages.

Chinese Office Action dated Apr. 2, 2020 in Chinese Patent Application No. 2019107139357 w/English translation, citing document AX therein, 10 pages.

Castro et al., "Practical Byzantine Fault Tolerance"; Proceedings of the Third Symposium on Operating Systems Design and Implementation, New Orleans, USA, Feb. 28, 1999. 14 pages.

International Search Report dated Jun. 8, 2018 in PCT/CN2018/080574, with English translation, citing documents AO-AR and AY therein.

Written Opinion dated Jun. 8, 2018 in PCT/CN2018/080574, citing documents AP-AR and AY therein.

Diego Ongaro, et al., "In Search of an Understandable Consensus Algorithm", 2014 USENIX Annual Technical Conference, Jun. 20, 2014.

Search Report of European Application No. 18777404.7, dated Dec. 22, 2020, citing references AX and AY, 9 pages.

Doug Woos et al., Planning for Change in a Formal Verification of the Raft Consensus Protocol. Jan. 18, 2016, pp. 154-165 (12 pages).

KPMG Blockchain: Consensus: Immutable agreement for the Internet of value, Retrieved from the Internet: URL:https://assets.kpmg/content/dam/kpmg/c_n/pdf/en/2016/09/blockchain-consensus.pdf on Nov. 24, 2020, 28 pages.

Indian Examination Report, with partial English translation, dated Jun. 1, 2021 in Indian Patent Application No. 201947017559 filed May 2, 2019, citing reference AO therein, 6 pages.

\* cited by examiner

DISTRIBUTED SYSTEM, MESSAGE PROCESSING METHOD, NODES, CLIENT, AND STORAGE MEDIUM

RELATED APPLICATION

This application is a continuation of International Application No. PCT/CN2018/080574, filed on Mar. 26, 2018, which claims priority to Chinese Patent Application No. 201710203499.X, filed with the Chinese Patent Office on Mar. 30, 2017. The entire disclosures of the prior applications are hereby incorporated by reference in their entirety.

FIELD OF THE TECHNOLOGY

The present disclosure relates to the communications technology.

BACKGROUND OF THE DISCLOSURE

A distributed system is a computing system that is commonly used at present, and is applied to various fields such as block chains and distributed service frameworks (for example, ZooKeeper).

In a working process of the distributed system, nodes need to reach a consensus on a to-be-processed message from a client, that is, all nodes or most nodes in the distributed system confirm a received message, and then synchronously store/process the message.

For example, when the distributed system is applied to a private block chain or a federal block chain, the nodes reach, based on a consensus algorithm, a consensus on a transaction record committed by the client (that is, determine reliability of the transaction record), and store the transaction record in block chains maintained by the nodes, thereby ensuring consistency of the transaction record stored by the nodes.

A consensus algorithm used by a distributed system implemented in the related technology focuses on consensus reaching efficiency or on ensuring fault-tolerant performance in a consensus reaching process. The fault-tolerant performance means that it is ensured that most nodes can still reach a consensus when there is a faulty node or a malicious node.

For a consensus algorithm provided in the related technology for ensuring the consensus reaching efficiency, it is difficult to ensure consensus reliability due to that a faulty node and a malicious node cannot be detected.

SUMMARY

Embodiments of the present disclosure provide a distributed system and a message processing method. The distributed system includes a client and a plurality of nodes. The client includes processing circuitry that is configured to send a message including a digital signature of the client. The distributed system is in a first consensus mode for reaching a consensus on the message. The processing circuitry obtains results from a subset of the nodes that receive the message. The results have respective digital signatures of the subset of the nodes. After verifying the digital signatures of the subset of the nodes, the processing circuitry of the client determines, based on the results, whether one or more of the nodes in the distributed system is malfunctioned.

In an embodiment, the distributed system further includes the nodes. One of the nodes is configured as a leader node and remaining nodes of the nodes are configured as follower nodes. In an example, the message from the client further includes first unique information. The subset is of the follower nodes. Each of the results includes second unique information. For each of the follower nodes, the processing circuitry of the client is further configured to determine whether the respective follower node is an erroneous node based on a determination that the second unique information in the result sent by the respective follower node is different from the first unique information in the message from the client. The processing circuitry of the client determines that the respective follower node is a faulty node when a result is not received from the respective follower node. In an example, the message from the client includes a first sequence number. Each of the results includes a second sequence number. For each of the follower nodes, the processing circuitry of the client is further configured to determine that the respective follower node sends an inconsistent sequence number when the second sequence number is different from the first sequence number. The processing circuitry of the client determines that the leader node is a malicious node when a number of the follower nodes sending the inconsistent sequence numbers exceeds a threshold.

In an embodiment, the processing circuitry of the client triggers the nodes in the distributed system to switch to a second consensus mode when the client determines at least one of: the leader node is the malicious node, at least N of the follower nodes are the faulty nodes, and at least M of the follower nodes are the erroneous nodes. N and M are positive integers.

In an embodiment, after receiving the trigger from the client to switch to the second consensus mode, the processing circuitry of each of the nodes sends a hash value in a message stored by the respective node and a digital signature of the respective node to other nodes in the distributed system. The processing circuitry of the respective node receives hash values in messages from the other nodes. The processing circuitry of the respective node determines whether the hash value stored by the respective node is consistent with the hash values from the other nodes and sends a consistency confirmation to the client when the hash value stored by the respective node is determined to be consistent with the hash values from the other nodes.

In an embodiment, the processing circuitry of the client determines whether the consistency confirmation from each of the nodes is received. When the client does not receive the consistency confirmation from at least one of the nodes within a pre-determined time, the processing circuitry of the client notifies the nodes to switch to the second consensus mode. When the client receives the consistency confirmation from each of the nodes within the pre-determined time, the processing circuitry of the client notifies the nodes to switch to the first consensus mode.

In an embodiment, after receiving the trigger to switch to the second consensus mode, the processing circuitry of each of the nodes sends a hash value in a message stored by the respective node and a digital signature of the respective node to other nodes in the distributed system. The processing circuitry of the respective node receives another hash value in a message from one of the other nodes and determines whether the hash value stored by the node is consistent with the other hash value from the one of the other nodes. When the hash value of the respective node is determined to be consistent with the other hash value, the processing circuitry of the respective node sends a data confirmation to the one of the other nodes. The data confirmation includes a digital signature of the respective node and indicates that the message stored by the respective node is consistent with the message from the one of the other nodes. When the respective node receives the data confirmation from each of the other nodes, the processing circuitry of the respective node sends a data confirmation to the client.

In an embodiment, the processing circuitry of the client determines whether the message stored in the respective node is consistent with the messages stored in the other nodes based on the respective data confirmations. When each of the data confirmations is received within a pre-determined time, the processing circuitry of the client notifies the nodes to switch back to the first consensus mode and terminates switching to the second consensus mode. When at least one of the data confirmations is not received within the pre-determined time, the processing circuitry of the client notifies the nodes to switch to the second consensus mode.

In an embodiment, the processing circuitry of the leader node switches the nodes to the first consensus mode when a number of times that the nodes reach a consensus on the received message from the client in the second consensus mode exceeds a first consensus threshold of the leader node.

In an embodiment, the processing circuitry of one of the follower nodes is configured to count a number of times that a consensus is reached on the received message when receiving a notification to switch to the first consensus mode and send a switch acknowledgement to the leader node when the counted number of times exceeds a second consensus threshold of the one of the follower nodes.

Aspects of the disclosure also provide a non-transitory computer-readable storage medium storing instructions which when executed by one or more computers cause the one or more computers to perform the message processing method.

The embodiments of the present disclosure have such beneficial effects:

(1) Reliability of communication in the distributed system is ensured by using a digital signature: A digital signature is used for both parties in communication, that is, a digital signature of a message is carried when the message is sent, and reliability of the received message is ensured by verifying the digital signature.

(2) The follower nodes directly return the results to the client when receiving the message sent by the leader node, and add information such as a uniqueness field, a sequence number of the message, and a digital signature to the result, so that the client can directly determine consensus reaching between the follower nodes according to the results returned by the follower nodes, thereby efficiently detecting the abnormal node.

DESCRIPTION OF EMBODIMENTS

Figure 1:
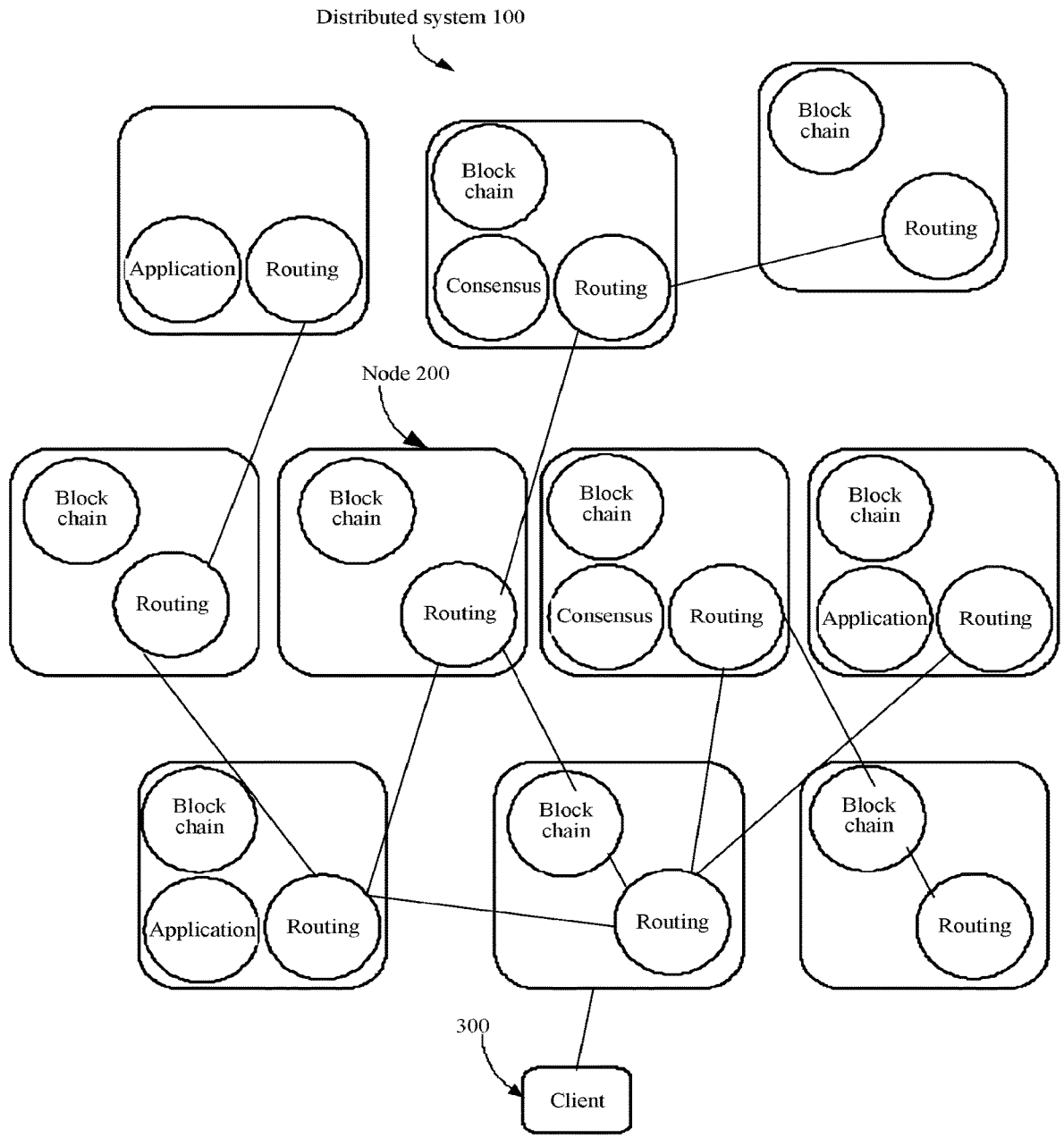
FIG. 1 is an optional schematic structural diagram of a distributed system 100 applied to a block chain system according to an embodiment of the present disclosure.

The present disclosure is further described in detail below with reference to the accompanying drawings and embodiments. The embodiments provided herein are merely used for explaining the present disclosure instead of limiting the present disclosure. In addition, technical solutions set forth in the embodiments of the present disclosure may be implemented in any combination without conflict.

(1) A distributed system is a system including a plurality of nodes and a client that are connected through network communication. Content of a message used for the network communication varies according to actual service scenarios. For example, the message may be a transaction record or an instruction executed by a state machine of a node.

(2) Consensus: In the distributed system, a node (or a node sending a message) verifies correctness of another message sent by another node (that is, another node in the distributed system other than the node sending the message), sends, if successfully verifying the correctness, a confirmation to the node sending the message, and persistently stores the message to support subsequent query.

For example, when the distributed system is implemented as a block chain system, a node verifies validness of a new block (including a newly generated transaction record) committed by another node, sends, if successfully verifying the validness, a confirmation to the node sending the new block, and adds the new block to a tail portion of a block chain stored by the corresponding node, to complete a consensus on the transaction record in the block chain.

(3) A consensus mode is also referred to as a consensus algorithm, and is an algorithm used for ensuring that nodes in the distributed system reach a consensus. The consensus mode may include the following types:

First consensus mode is a consensus mode in which relatively high consensus efficiency can be achieved, and a node fault or a Byzantine problem (a case in which one party sends a message to another party and the another party does not receive the message or receives wrong information) can be detected, but the Byzantine problem cannot be resolved. For example, algorithms implementing the first consensus mode include a Paxos algorithm and a recursive algorithm for fault tolerance (RAFT).

A second consensus mode is a consensus mode used for resolving the Byzantine problem. Algorithms implementing the second consensus mode include a Byzantine fault tolerance (BFT) algorithm, a practical Byzantine fault tolerance (PBFT) algorithm, a Byzantine fault tolerance-recursive algorithm for fault tolerance (BFT-RAFT), a BFT-Paxos algorithm, and the like.

(4) Consensus mode switching is also referred to as consensus mode adaptation. For a consensus algorithm used in a distributed network, when a network environment is desirable, an algorithm that has high consensus efficiency and that can be used for detecting an abnormal node (for example, a node having a Byzantine problem) is automatically used, to implement the first consensus mode; and when a malicious node is found or a node is erroneous, the consensus algorithm is automatically switched to an algorithm supporting Byzantine fault tolerance, to implement the second consensus mode.

A distributed system implementing the embodiments of the present disclosure includes a client and a plurality of nodes (computing devices in any form in an access network, for example, a server and a user terminal) that are connected through network communication. Functions of the client and the node are described below.

The node is configured to determine, through a voting operation when a new consensus cycle in a first consensus mode starts, whether the node is in a leader node state or a follower node state.

The node is configured to verify, when the node is in the leader node state, a digital signature of a message sent by the client, and send the message to follower nodes.

The node is configured to: receive, when the node is in the leader node state, reception acknowledgement notifications of more than a predetermined quantity of follower nodes, persistently store the message after verifying digital signatures of the reception acknowledgement notifications, and send a message storage notification to the follower nodes.

The node is further configured to: return, when the node is in the follower node state, a result to the client when receiving a message sent by a leader node, verify a digital signature of the message received from the leader node, and send a reception acknowledgement notification to the leader node.

The node is configured to verify, when the node is in the follower node state, a digital signature of the message storage notification received from the leader node, and persistently store the message received from the leader node.

The client is configured to determine an abnormal node in the distributed system according to the result returned by the follower node when the follower node receives the message.

In an embodiment, the client is further configured to: compare a uniqueness field (or unique information) included in the received result with a uniqueness field of the sent message after verifying a digital signature of the received result, determine that a follower node corresponding to an inconsistent uniqueness field is an erroneous node, and determine that a follower node not returning a result is a faulty node.

In an embodiment, the client is further configured to compare a sequence number carried in the received result with a sequence number of the sent message, and determine, when a quantity of follower nodes sending inconsistent sequence numbers exceeds an inconsistency quantity threshold, that the leader node is a malicious node.

In an embodiment, the client is further configured to determine that the leader node is a malicious node; or trigger, when determining there is a faulty node in the follower nodes, the nodes in the distributed system to switch to a second consensus mode.

In an embodiment, the node is further configured to compare, at a preparation stage of switching to the second consensus mode, a hash value of the message persistently stored by the node with a hash value of a message persistently stored by a node in the distributed system, and send a consistency confirmation to the client when determining that the hash values are consistent. The consistency confirmation carries a digital signature of the corresponding node.

The client is further configured to instruct, when receiving consistency confirmations of all the nodes within a pre-determined time, the nodes in the distributed system to return to the first consensus mode; or instruct, when not receiving consistency confirmations of all the nodes within a pre-determined time, the nodes in the distributed system to continue switching to the second consensus mode.

In an embodiment, the node is further configured to compare, at a preparation stage of switching to the second consensus mode, a hash value of the message persistently stored by the node with a hash value of a message persistently stored by a node in the distributed system, and send a data confirmation to a sending node of the message when determining that the hash values are consistent. The data confirmation carries a digital signature of the corresponding node.

The client is further configured to trigger, when nodes reaching a consensus do not receive, within a pre-determined time, a data confirmation from a node not reaching the consensus or the nodes in the distributed system do not receive a data confirmation in a pre-determined time, the nodes in the distributed system to continue switching to the second consensus mode.

In an embodiment, the node is further configured to switch to the first consensus mode with the follower nodes when the node is in the leader node state and when a quantity of times counted in the second consensus mode exceeds a consensus quantity-of-times threshold of the leader node. The counted quantity of times is a count of forming consensuses with the follower nodes on the received message.

In an embodiment, the node is further configured to send, to the follower nodes when the node is in the leader node state and when the counted quantity of times exceeds the consensus quantity-of-times threshold of the leader node, a notification of switching to the first consensus mode, and start to synchronously switch to the first consensus mode with the follower nodes when receiving switch acknowledgements sent by all the follower nodes.

In an embodiment, the node is further configured to receive, when the node is in the follower node state, a notification of switching to the first consensus mode, and send a switch acknowledgement to the leader node when a counted quantity of times that a consensus is reached on the received message exceeds a consensus quantity-of-times threshold of the follower node.

In an embodiment, the node is further configured to perform the voting operation again when not receiving heartbeat information of the leader node or when the leader node is a malicious node, to determine whether the node is in the leader node state or the follower node state.

In an embodiment, the node is further configured to: send a voting request to the nodes in the distributed system when the new consensus cycle starts and heartbeat information of no node is received, convert into the leader node state when receiving voting acknowledgements returned by a pre-determined quantity of nodes, and periodically send heartbeat information to the nodes in the distributed system.

The voting acknowledgement is sent by the nodes in the distributed system, and a digital signature carried in the voting request is verified before the voting acknowledgement is sent.

In an embodiment, the node is further configured to convert into the follower node state when the new consensus cycle starts and heartbeat information sent by a node in the distributed system is received.

Descriptions are provided below by using an example in which the distributed system is implemented as a block chain system. FIG. 1 is an optional schematic structural diagram of a distributed system 100 implemented as a block chain system according to an embodiment of the present disclosure. The distributed system 100 includes a plurality of nodes 200 (computing devices in any form in an access network, for example, a server and a user terminal), and further includes a client 300. A peer-to-peer (P2P) network is formed between the nodes 200. The P2P protocol is an application-layer protocol running over the Transmission Control Protocol (TCP).

Referring to functions of the node 200 in the block chain system shown in FIG. 1, the functions include the following:

(1) Routing: which is a basic function of the node, and is used for supporting communication between nodes.

In addition to the routing function, the node 200 may further have the following functions:

(2) Application: which is deployed in a block chain, and is used for implementing a particular service according to an actual service requirement, recording data related to function implementation to form recorded data, adding a digital signature to the recorded data to indicate a source of task data, and sending the recorded data to another node in the block chain system (that is, any node receiving the recorded data in the block chain system), so that the another node adds the recorded data to a temporary block when verifying a source and integrity of the recorded data.

For example, services implemented by the application include:

(2.1) Wallet: used for providing a transaction function with electronic money, including transaction initiation (where to be specific, a transaction record of a current transaction is sent to another node in the block chain system, and the another node stores, after successfully verifying the transaction record, recorded data of the transaction to a temporary block in a block chain in response to admitting that the transaction is valid). Certainly, the wallet further supports querying for remaining electronic money in an electronic money address.

(2.2) Shared account book: used for providing functions of operations such as storage, query, and modification of account data. Recorded data of the operations on the account data is sent to another node in the block chain system. The another node stores, after verifying that the account data is valid, the recorded data to a temporary block in response to admitting that the account data is valid, and may further send an acknowledgement to a node initiating the operations.

(2.3) Intelligent contract: which is a computerized protocol, can be used for executing conditions of a contract, and is implemented by using code that is deployed in the shared account book and that is executed when a condition is satisfied. The code is used for completing, according to an actual service requirement, an automated transaction, for example, searching for a delivery status of goods purchased by a purchaser, and transferring electronic money of the purchaser to an address of a merchant after the purchaser signs for the goods. Certainly, the intelligent contract is not limited only to a contract used for executing a transaction, and may further be a contract used for processing received information.

(3) Block chain: including a series of blocks that are consecutive in a chronological order of generation. Once a new block is added to the block chain, the new block is no longer removed. The block records recorded data committed by the node in the block chain system.

Figure 2:
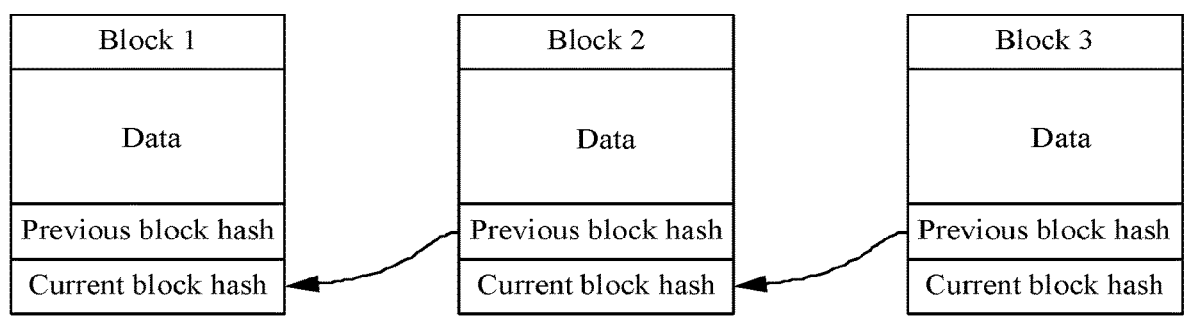
FIG. 2 is an optional schematic diagram of a block structure according to an embodiment of the present disclosure.

In an example, FIG. 2 is an optional schematic diagram of a block structure according to an embodiment of the present disclosure. Each block includes a hash value of a transaction record stored in the current block (a hash value of the current block) and a hash value of a previous block. Blocks are connected according to hash values to form a block chain. In addition, the block may further include information such as a timestamp indicating a block generation time.

Figure 3A:
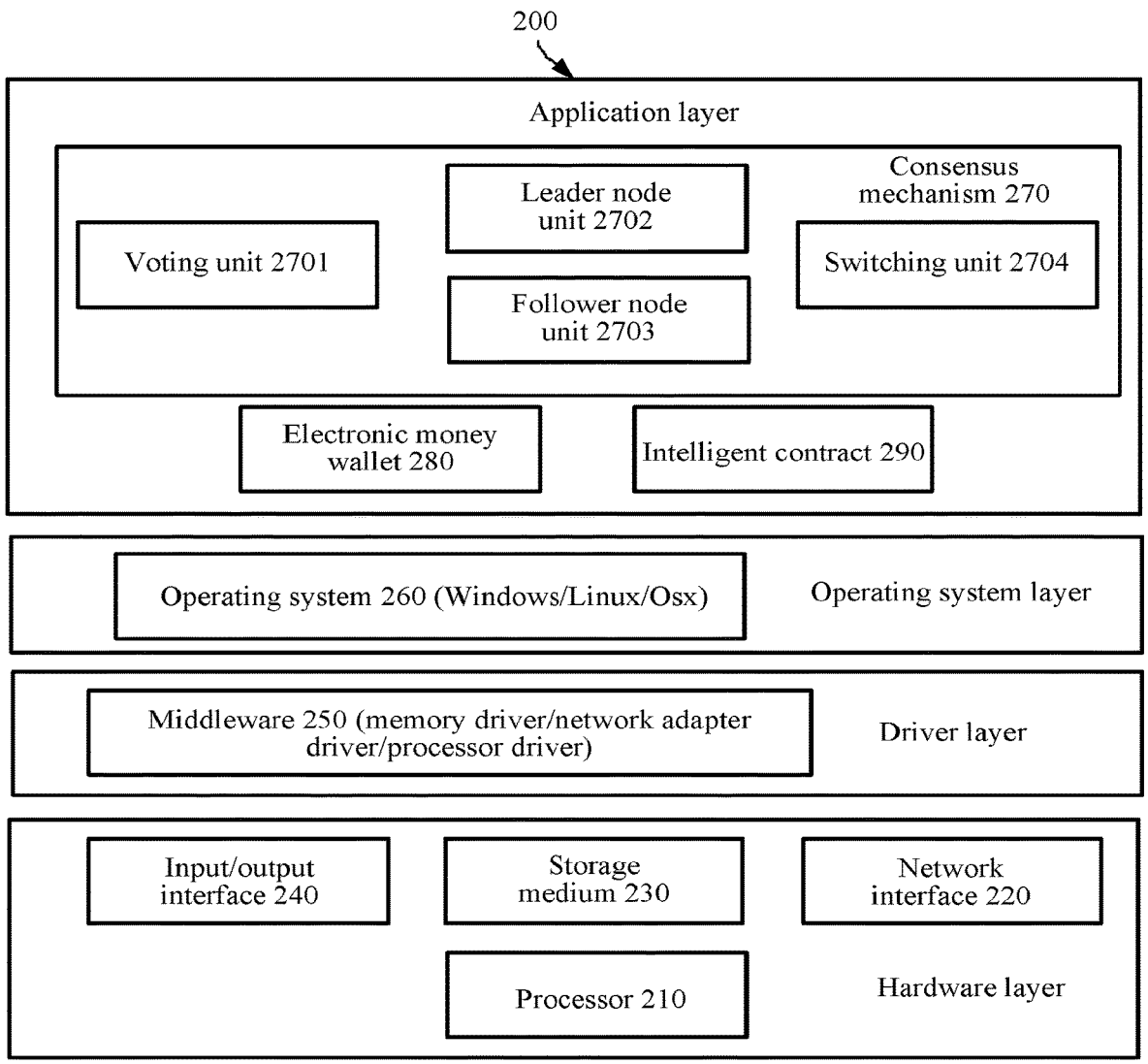
FIG. 3A is an optional schematic structural diagram of software/hardware of a node 200 according to an embodiment of the present disclosure.

Composition of the distributed system implementing the embodiments of the present disclosure can flexibly vary. For example, in the distributed system, any machine such as a server or a terminal can be added to the distributed system to become a node. In terms of hardware, for example, FIG. 3A is an optional schematic structural diagram of software/hardware of a node 200 according to an embodiment of the present disclosure. The node 200 includes a hardware layer, a driver layer, an operating system layer, and an application layer. A structure of the node 200 shown in FIG. 3A is merely an example and does not constitute a limitation on the structure of the node 200. For example, the node 200 may be provided with more components than those shown in FIG. 3A according to an implementation requirement, or some components may be omitted.

The hardware layer of the node 200 includes a processor 210, an input/output interface 240, a storage medium 230, and a network interface 220. The components may be connected through a system bus for communication.

The processor 210 may be implemented by using a central processing unit (CPU), a microcontroller unit (MCU), an application-specific integrated circuit (ASIC), or a field programmable gate array (FPGA).

The input/output interface 240 may be implemented by using an input/output device such as a display screen, a touchscreen, or a speaker.

The storage medium 230 may be implemented by using a non-volatile storage medium such as a flash, a hard disk, or an optical disc, or may be implemented by using a volatile storage medium such as a double data rate (DDR) dynamic cache. The storage medium 230 stores executable instructions used for performing a message processing method.

The network interface 220 provides external data, for example, a remotely set access capability of the storage medium 230, to the processor 210. For example, the network interface 220 can implement communication based on communication standards such as Code Division Multiple Access (CDMA) and Wideband Code Division Multiple Access (WCDMA) and evolved standards thereof.

The driver layer includes middleware 250 used by an operating system 260 for identifying the hardware layer and communicating with each component of the hardware layer, and for example, may be a set of drivers for each component of the hardware layer.

The operating system 260 is configured to provide a user-oriented graphics interface, and display various intermediate results and final results of various block-chain-based application processing.

The application layer includes a consensus mechanism 270 (configured to adaptively switch between a first consensus mode and a second consensus mode) configured to implement consensus reaching between nodes and functions, for example, an electronic money wallet 280 and an intelligent contract 290, that are implemented by the nodes based on the distributed system. In an example, the application layer is configured to be operable in the first consensus mode and the second consensus mode.

Using the application layer as an example, referring to FIG. 3A, the consensus mechanism 270 of the application layer of the node 200 provided in FIG. 3A includes: a voting unit 2701, a leader node unit 2702, and a follower node unit 2703.

The voting unit 2701 is configured to enable the node 200 and other nodes in the distributed system to perform a voting operation when a new consensus cycle in the first consensus mode starts, to determine whether the node 200 is in a leader node state or a follower node state.

The leader node unit 2702 is configured to: receive a message of a client when the node 200 is in the leader node state; send the message to follower nodes after verifying a digital signature of the message; when receiving reception acknowledgement notifications of more than a predetermined quantity of follower nodes, persistently store the message after verifying digital signatures of the reception acknowledgement messages; and send a message storage notification to the follower nodes.

Results returned by the follower nodes when the follower nodes receive the message are used by the client for determining an abnormal node in the distributed system.

The follower node unit 2703 is configured to: when the node 200 is in the follower node state, persistently store the received message after verifying a digital signature of the received message storage notification. The message is used by the client for determining the abnormal node.

In an embodiment, the follower node unit 2703 is configured to perform the following operations when the node 200 is in the follower node state: receiving the message sent by a leader node, returning a result to the client, sending a reception acknowledgement notification to the leader node after verifying a digital signature of the received message, and persistently storing the received message after verifying the digital signature of the received message storage notification.

In an embodiment, when the node 200 is in the follower node state, the result returned by the follower node to the client carries the following information: a uniqueness field of the message and a digital signature of the follower node.

The result is used by the client for: verifying the carried digital signature, compare the uniqueness field included in the result with a uniqueness field of the sent message, determining a follower node corresponding to an inconsistent uniqueness field is an erroneous node, and determining a follower node not returning a corresponding result is a faulty node.

In an embodiment, when the node 200 is in the follower node state, the result returned by the follower node carries a sequence number of the message received by the follower node. The sequence number carried in the result is used by the client for comparing the sequence number carried in the received result and a sequence number of the sent message, and determining, when a quantity of follower nodes sending inconsistent sequence numbers exceeds an inconsistency quantity threshold (or a threshold), that the leader node is a malicious node.

In an embodiment, the consensus mechanism 270 further includes a switching unit 2704, configured to switch to the second consensus mode in response to trigger of the client when the client determines that the leader node is a malicious node or determines that there is a faulty node in the follower nodes.

In an embodiment, the switching unit 2704 is configured to switch to the second consensus mode in response to a trigger of the client when the client determines that the leader node and the follower nodes satisfy at least one of: the leader node is a malicious node, at least N of the follower nodes are faulty nodes, and at least M of the follower nodes are erroneous nodes where N and M are positive integers.

In an embodiment, the switching unit 2704 is further configured to perform the following operations when the node 200 is at a preparation stage of switching to the second consensus mode:

comparing a hash value of the message persistently stored by the node 200 with a hash value of a message persistently stored by a node in the distributed system (that is, a node in the distributed system other than the node 200), sending a consistency confirmation to the client when determining that the hash values are consistent, where the consistency confirmation carries a digital signature of the corresponding node that is verified by the client when the client receives the consistency confirmation; and switching to the first consensus mode in response to a notification of the client when the client receives consistency confirmations of all the nodes within a pre-determined time; or continuing switching to the second consensus mode in response to a notification of the client when the client does not receive consistency confirmations of all the nodes within a pre-determined time.

In an embodiment, the switching unit 2704 is further configured to perform the following operations when the node 200 is at a preparation stage of switching to the second consensus mode:

comparing a hash value of the message persistently stored by the node with a hash value of a message persistently stored by a node in the distributed system (that is, a node in the distributed system other than the node 200), and sending a data confirmation to a sending node of the message when determining that the hash values are consistent, where the data confirmation carries a digital signature of the corresponding node.

The data confirmation is used by the client for triggering, when nodes reaching a consensus do not receive, within a pre-determined time, a data confirmation of a node not reaching the consensus or the nodes in the distributed system do not receive, within a pre-determined time, a data confirmation sent by another node, the nodes in the distributed system to continue switching to the second consensus mode.

In an embodiment, the leader node unit 2702 is further configured to switch to the first consensus mode with the follower nodes when the node 200 is in the leader node state and a quantity of times that a consensus is reached with the follower nodes on the received message that is counted in the second consensus mode exceeds a consensus quantity-of-times threshold of the leader node.

In an embodiment, the leader node unit 2702 is further configured to send, to the follower nodes when the quantity of times counted in the second consensus mode exceeds the consensus quantity-of-times threshold of the leader node, a notification of switching to the first consensus mode, and start to synchronously switch to the first consensus mode with the follower nodes when switch acknowledgements sent by all the follower nodes are received. The counted quantity of times is a count of forming consensuses with the follower nodes on the received message.

In an embodiment, the follower node unit 2703 is further configured to perform the following operations when the node is in the follower node state: counting, when receiving a notification of switching to the first consensus mode, a quantity of times that a consensus is reached on the received message, and sending a switch acknowledgement to the leader node when the counted quantity of times exceeds a consensus quantity-of-times threshold of the follower node.

In an embodiment, the voting unit 2701 is further configured to perform a voting operation with the nodes in the distributed system (that is, the nodes in the distributed system other than the node 200) when heartbeat information of the leader node is not received or the leader node is a malicious node, to determine whether the node 200 is in the leader node state or the follower node state.

In an embodiment, the voting unit 2701 is further configured to send a voting request to the nodes in the distributed system when the new consensus cycle starts and heartbeat information sent by a node in the distributed system is not received, where the voting request carries a digital signature of the node; switch to the leader node state when voting acknowledgements returned by a pre-determined quantity of nodes are received, and periodically send heartbeat information to the nodes in the distributed system to remain in the leader node state. The voting acknowledgements are sent by the nodes in the distributed system after the nodes verify the digital signature carried in the voting request.

The voting unit 2701 is further configured to switch to the follower node state when the new consensus cycle starts and heartbeat information sent by a node in the distributed system is received.

In the distributed system, the client may be a combination of hardware and a software environment deployed on the hardware. Based on this, the client may also be referred to as a client device, configured to implement functions such as mining (for example, Bitcoin mining), node management, and deployment of an intelligent contract.

Figure 3B:
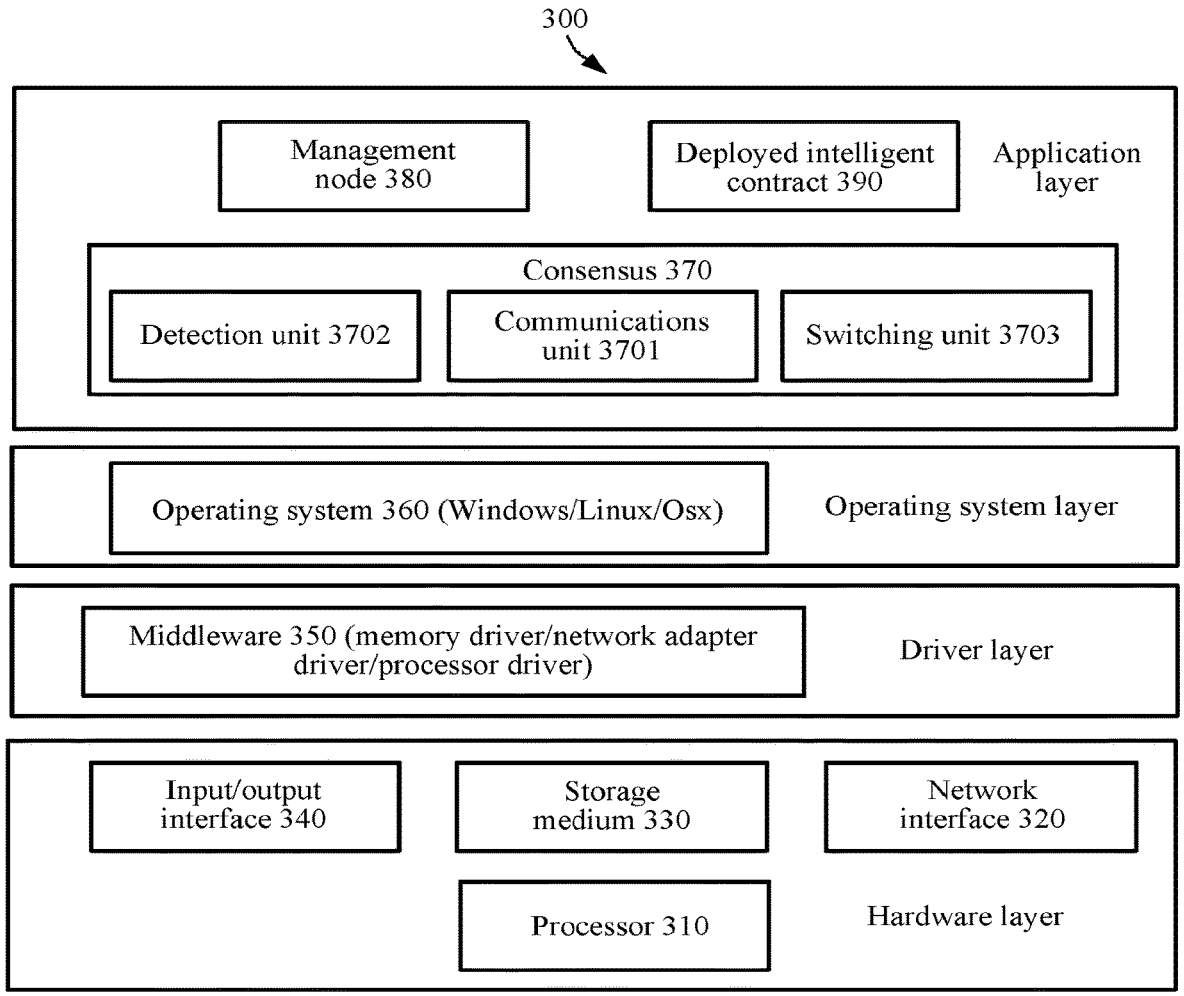
FIG. 3B is an optional schematic structural diagram of software and hardware of a client 300 according to an embodiment of the present disclosure.

FIG. 3B is an optional schematic structural diagram of software/hardware of a client according to an embodiment of the present disclosure. A client 300 includes a hardware layer, a driver later, an operating system layer, and an application layer. A structure of the client 300 shown in FIG. 3B is merely an example and does not constitute a limitation on the structure of the client 300. For example, the client 300 may be provided with more components than those shown in FIG. 3B according to an implementation requirement, or some components may be omitted according to an implementation requirement.

The hardware layer of the client 300 includes a processor 310, an input/output interface 340, a storage medium 330, and a network interface 320. The components may be connected through a system bus for communication.

The processor 310 may be implemented by using a CPU, an MCU, an ASIC, or an FPGA.

The input/output interface 340 may be implemented by using an input/output device such as a display screen, a touchscreen, or a speaker.

The storage medium 330 may be implemented by using a non-volatile storage medium such as a flash, a hard disk, or an optical disc, or may be implemented by using a DDR. The storage medium 330 stores executable instructions used for performing the foregoing communication status processing method (or the message processing method described above).

The network interface 320 provides external data, for example, a remotely set access capability of the storage medium 330, to the processor 310. For example, the network interface 320 can implement communication based on communication standards such as CDMA and WCDMA and evolved standards thereof.

The driver layer includes middleware 350 used by an operating system 360 for identifying the hardware layer and communicating with each component of the hardware layer, and for example, may be a set of drivers for each component of the hardware layer.

The operating system 360 is configured to provide a user-oriented graphics interface, and display various intermediate results and final results of various block-chain-based application processing.

The application layer is configured to: send a message to nodes in a distributed system, so that the nodes reach a consensus on the message to persistently store the message; detect an abnormal node in the distributed system; and trigger the nodes to switch a consensus mode.

Using the application layer as an example, FIG. 3B provides a functional structure of the application layer of the client 300. The functional structure includes a management node 380, a deployed intelligent contract 390, and a consensus 370.

In an example, the consensus 370 includes an communications unit 3701 and a detection unit 3702.

The communications unit 3701 is configured to send a message to a leader node in the nodes of the distributed system. The message carries a digital signature of a client.

The digital signature is verified by the leader node. A digital signature of the leader node is added to the received message to send the message to follower nodes in the distributed system.

The communications unit 3701 is configured to receive a result returned by the follower node when the follower node receives the message.

The detection unit 3702 is configured to determine an abnormal node in the distributed system according to the result returned by the follower node when the follower node receives the message.

In an embodiment, the detection unit 3702 is further configured to: compare a uniqueness field included in the received result with a uniqueness field of the sent message after verifying a digital signature of the received result, determine that a follower node corresponding to an inconsistent uniqueness field is an erroneous node, and determine that a follower node not returning a corresponding result is a faulty node.

In an embodiment, the detection unit 3702 is further configured to compare a sequence number carried in the received result with a sequence number of the sent message, and determine, when a quantity of follower nodes sending inconsistent sequence numbers exceeds an inconsistency quantity threshold, that the leader node is a malicious node.

In an embodiment, the consensus 370 further includes a switching unit 3703, configured to trigger, when it is determined that the leader node is a malicious node or there is a faulty node in the follower nodes, the nodes in the distributed system to switch to a second consensus mode.

In an embodiment, the switching unit 3703 is further configured to instruct, when receiving consistency confirmations of all the nodes within a pre-determined time, all the nodes to return to a first consensus mode; or instruct, when not receiving consistency confirmations of all the nodes within a pre-determined time, all the nodes to continue switching to the second consensus mode.

The consistency confirmation carries a digital signature of the node and is sent when the node is at a preparation stage of switching to the second consensus mode. The node determines, before sending, that a hash value of the message persistently stored by the node is consistent with a hash value of a message persistently stored by a node in the distributed system.

In an embodiment, the switching unit 3703 is further configured to trigger, when nodes reaching a consensus do not receive, within a pre-determined time, a data confirmation from a node not reaching the consensus or the nodes in the distributed system do not receive, within a pre-determined time, a data confirmation sent by another node, the nodes in the distributed system to continue switching to the second consensus mode.

The data confirmation carries a digital signature of a corresponding node and is sent by the node 200 at a preparation stage of switching to the second consensus mode. The node 200, determines, before sending, that a hash value of the message persistently stored by the node 200 is consistent with a hash value of a message persistently stored by a node in the distributed system (that is, a node in the distributed system other than the node 200).

For the distributed system provided in this embodiment of the present disclosure, the nodes reach a consensus on the message from the client in the first consensus mode. The first consensus mode can ensure consensus reaching efficiency of the nodes. Certainly, that the nodes in the distributed system reach a consensus on the message from the client in the second consensus mode by default is not excluded from this embodiment of the present disclosure.

Figure 5:
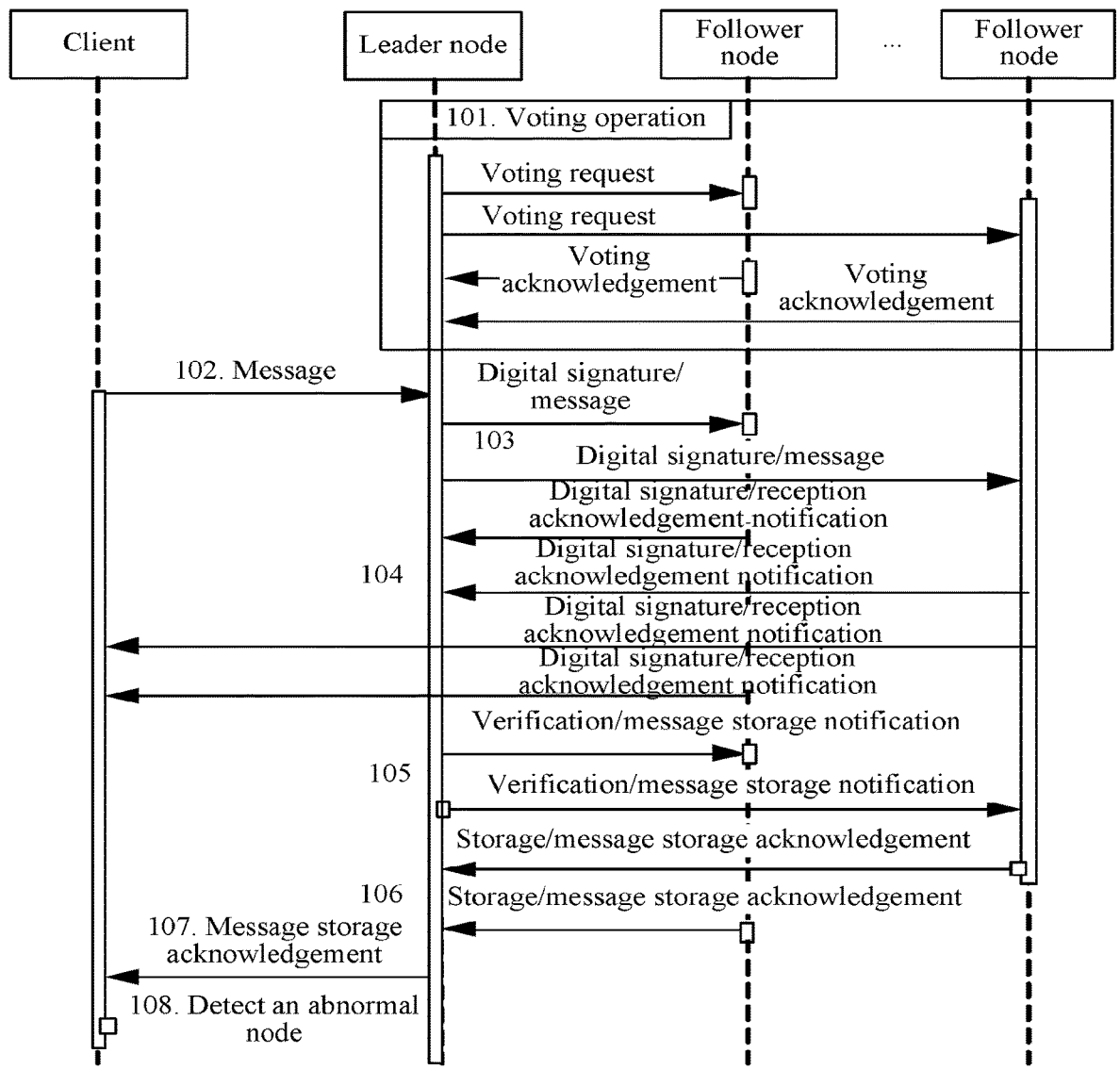
FIG. 5 is an optional schematic flowchart of reaching a consensus by nodes in a distributed system in a first consensus mode and detecting a faulty node and a malicious node according to an embodiment of the present disclosure.

An implementation of reaching the consensus in the first consensus mode is described. FIG. 5 is an optional schematic flowchart of reaching a consensus by nodes in a distributed system in a first consensus mode and detecting a faulty node and a malicious node according to an embodiment of the present disclosure. Descriptions are provided with reference to step 101 to step 108.

Step 101: A plurality of nodes in the distributed system performs a voting operation when a new consensus cycle in a first consensus mode starts, to determine whether the nodes are in a leader node state or a follower node state.

In an embodiment, the nodes in the distributed system include three types (also referred to as states): a competitive node, a leader node, and a follower node. Each node in the distributed system enables a timer. When the new consensus cycle used for reaching a consensus reaches, each node is a competitive node. Each competitive node attempts to convert into a leader node (where for example one distributed system has only one valid leader node) through the voting operation, and a competitive node not becoming the leader node converts into a follower node.

When the new consensus cycle starts, each competitive node detects whether heartbeat information sent by another node is received. If no heartbeat information is received, it indicates that no leader node is generated within the current consensus cycle, and the competitive node sends a voting request to other nodes. The voting request carries a digital signature of the sending node. After successfully verifying the digital signature in the voting request, a receiving node determines reliability of the voting request, that is, sends a voting acknowledgement to the sending node. When a node receives voting acknowledgements from a sufficient quantity (where a pre-determined quantity may be half a quantity of the nodes) of other nodes, the node converts into the leader node, and periodically sends heartbeat information to the other nodes. A competitive node receiving the heartbeat information converts into the follower node. When no node receives the sufficient quantity of voting acknowledgements within a consensus cycle, a new consensus cycle starts to continue the voting operation until the leader node and the follower nodes are determined.

Figure 4:
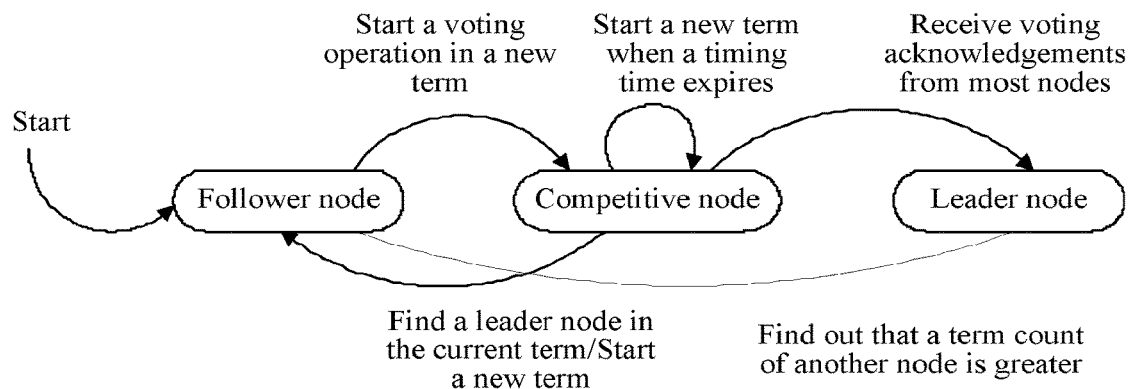
FIG. 4 is an optional schematic diagram of performing a voting operation by nodes in a first consensus mode to determine a leader node and follower nodes according to an embodiment of the present disclosure.

Using a RAFT algorithm as an example of the first consensus mode, FIG. 4 is an optional schematic diagram of performing a voting operation by nodes in a first consensus mode to determine a leader node and follower nodes according to an embodiment of the present disclosure.

In a distributed system, at any time point, any node is in one of the following three states: a leader node, a follower node, and a competitive node. In most time of normal running of the distributed system, the distributed system includes one leader node, and other nodes are all follower nodes. The leader node receives a message of a client.

Working time of the distributed system is divided into consecutive consensus cycles which are also referred to as terms herein. Each term may be of any duration, and the terms are numbered by using consecutive integers. The leader node is first voted in each term. At a voting stage, a plurality of competitive nodes contends for the leader node. Once a node becomes the leader node, other competitive nodes convert into follower nodes. In an embodiment, the node becoming the leader node serves as the leader node all the time within the term. If the leader node is faulty, the other nodes perform a voting operation in a new term.

There cannot be a plurality of leader nodes within any term (unless a malicious node disguises as the leader node). Each node maintains a count of a current term, and communication between nodes each time includes the count of the term. When each node detects that a term count maintained by the node is less than a term count maintained by another node, the node updates the term count of the node to be a maximum value that is detected.

When a leader node and a competitive node in a previous consensus cycle find out that their term counts are less than a term count of another node, the leader node and the competitive node immediately convert into follower nodes, to ensure that there is only one leader node within each term, for example.

The leader node voting operation is triggered by using a heartbeat mechanism in the RAFT algorithm. When the distributed system is started, all nodes are initialized into a follower node state to set a term to 0, and enable a timer. After the timer expires, a follower node converts into a competitive node. Once the follower node converts into the competitive node, the follower node performs the following operations:

Step 1011: Increase a term count of the node.
Step 1012: Enable a new timer.
Step 1013: Send a voting request (Request Vote) Remote Procedure Call (RPC) Protocol message to other nodes, and wait for the other nodes to reply a voting acknowledgement.

If receiving voting acknowledgements from most nodes before the timer expires, the node converts into a leader node. If an Append Entries heartbeat RPC message whose appended content is null and that is sent by another node is received, it indicates that the another node has been selected as the leader node, and the node converts into a follower node. If none of the foregoing two types of information is received when the timer expires, a new voting operation is performed.

After the node receives votes from most nodes to become the leader node, the node immediately sends an Append Entries heartbeat RPC message to all nodes. After receiving the Append Entries heartbeat RPC message, the competitive node converts into a follower node, and the voting operation ends.

Step 102: The client adds a digital signature to a message, and sends the message carrying the digital signature to a leader node.

The client encrypts a digest of the message by using a private key of the client (where any digest algorithm may be used to extract the digest from the message in this embodiment of the present disclosure), to form the digital signature.

Step 103: After successfully verifying the digital signature of the message, the leader node adds a digital signature of the leader node to the message, and sends the message to follower nodes.

The leader node decrypts the digital signature by using a public key to obtain the digest, and compares the digest with a digest obtained by using a digest algorithm (which is consistent with the digest algorithm used by the client). If the digests are consistent, it indicates that a source of the message is reliable. The leader node encrypts the digest of the message by using a private key of the leader node to form the digital signature of the leader node, and adds the digital signature of the leader node to the message to send the message to each follower node. A digital signature of the client may be or may not be carried in the message. If comparing that the digests are inconsistent, the leader node may discard the message and requests the client to retransmit the message.

Step 104: After receiving the message sent by the leader node, the follower node verifies the digital signature of the received message, sends a reception acknowledgement notification to the leader node after the verification succeeds, and sends a result to the client.

The follower node decrypts the digital signature of the received message by using the public key to obtain the digest, and compares the digest with a digest obtained by using a digest algorithm (which is consistent with the digest algorithm used by the leader node). If the digests are consistent, it indicates that a source of the message is reliable. The follower node encrypts a digest of the reception acknowledgement notification by using a private key of the follower node to form a digital signature of the follower node, and returns the reception acknowledgement notification to the leader node.

The result sent by the follower node to the client includes two cases:

(1) Within a current consensus cycle, if the follower node receives the message sent by the leader node for the first time, the result sent to the client includes: a sequence number of the received message; a uniqueness field of the message (a field in the message, which can be distinguished from a field of another message); and a digital signature of the follower node for the result. The digital signature is obtained by encrypting a digest of the result by using the private key of the follower node.

(2) Within a current consensus cycle, if the follower node receives the message sent by the leader node not for the first time, the result sent to the client includes a uniqueness field of the message (a field in the message, which can be distinguished from a field of another message) and a digital signature of the follower node for the result. The digital signature is obtained by encrypting a digest of the result by using the private key of the follower node.

Step 105: The leader node verifies a digital signature carried in the received reception acknowledgement notification, persistently stores the message after continuously receiving reception acknowledgement notifications sent by a pre-determined quantity of follower nodes, and sends a message storage notification to the follower nodes.

The message storage notification carries a digital signature of the leader node for the message storage notification, and the digital signature is obtained by encrypting a digest of the message storage notification by using the private key of the leader node.

Persistent storage means that the leader node stores the message in a non-volatile manner. For example, in a block chain system, a node (the leader node) receiving a transaction record committed by the client stores the transaction record in a new block of a block chain.

Step 106: The follower node receives the message storage notification, persistently stores the message locally after successfully verifying a carried digital signature, and sends a message storage acknowledgement carrying a digital signature to the leader node.

The follower node decrypts the digital signature of the received message storage notification by using the public key to obtain the digest, and compares the digest with a digest obtained by using a digest algorithm (which is consistent with a digest algorithm used by the leader node). If the digests are consistent, it indicates that a source of the message storage notification is reliable. The follower node encrypts a digest of the message storage acknowledgement by using the private key of the follower node to form the digital signature of the follower node, and returns the message storage acknowledgement carrying the digital signature to the leader node.

Step 107: The leader node verifies a digital signature of the received message storage acknowledgement, and sends the message storage acknowledgement to the client if receiving message storage acknowledgements of follower nodes whose quantity exceeds half the quantity of the nodes and successfully verifying digital signatures.

The message storage acknowledgement sent by the leader node to the client carries the digital signature of the leader node that is used by the client for verifying reliability of a source of the message storage acknowledgement.

Step 108: The client detects an abnormal node according to the result returned by the follower node when the follower node receives the message: determine whether the leader node is a malicious node, and determine whether there is a faulty node in the follower nodes.

In an embodiment, after successfully verifying the digital signature of the result returned by each follower node (where the result is sent by each follower node after the follower node receives the message sent by the leader node), the client compares a uniqueness field included in the received result with a uniqueness field of the sent message; determines, if the uniqueness fields are not consistent, that a follower node sending the inconsistent uniqueness field is an erroneous node; and determines that a follower node not returning a result is a faulty node.

In an embodiment, when the leader node is a leader node newly generated within a new consensus cycle, and when the follower node receives the message sent by the leader node, the result sent by the follower node to the client further includes a sequence number of the received message in addition to the uniqueness field and the digital signature, so that the client can compare the sequence number carried in the received result with a sequence number of the sent message. When a quantity of follower nodes sending inconsistent sequence numbers exceeds a quantity threshold, it indicates that the newly generated leader node sends a forged message to the follower nodes. Therefore, it is determined that the leader node is a malicious node.

It may be learned from the foregoing steps that in the first consensus mode:

(1) Communication reliability is ensured by using the digital signature:

Both parties in any communication use digital signatures. That is, a sender adds a digital signature of a message when sending the message, for example, encrypting a digest of the message by using a private key of an asymmetrical encryption algorithm of the sender, to form a digital signature of the sender. A receiver verifies the digital signature to ensure reliability of the message, that is, decrypts the signature of the message by using a public key of the asymmetrical encryption algorithm (where it is ensured that the receiver and the sender use the same asymmetrical encryption algorithm, and therefore the receiver pre-learns of the public key), and compares a digest obtained through decryption with the digest extracted from the message. If the digests are consistent, it indicates that the digital signature is successfully verified, and the message sent by the sender is reliable.

(2) The follower node directly returns the result to the client when receiving the message sent by the leader node, and adds information such as the uniqueness field, the sequence number of the message, and the digital signature to the result, so that the client can directly determine consensus reaching of the follower nodes according to the result returned by the follower node, thereby easily detecting the abnormal node.

When the abnormal node is detected in the first consensus mode, because the first consensus mode is applicable to ensure consensus efficiency of the node but has a limitation on abnormal fault-tolerant performance of the node, the embodiments of the present disclosure provide a solution of enabling a distributed system to switch to a second consensus mode with better fault-tolerant performance when there is an abnormal node in the distributed system.

Figure 6:
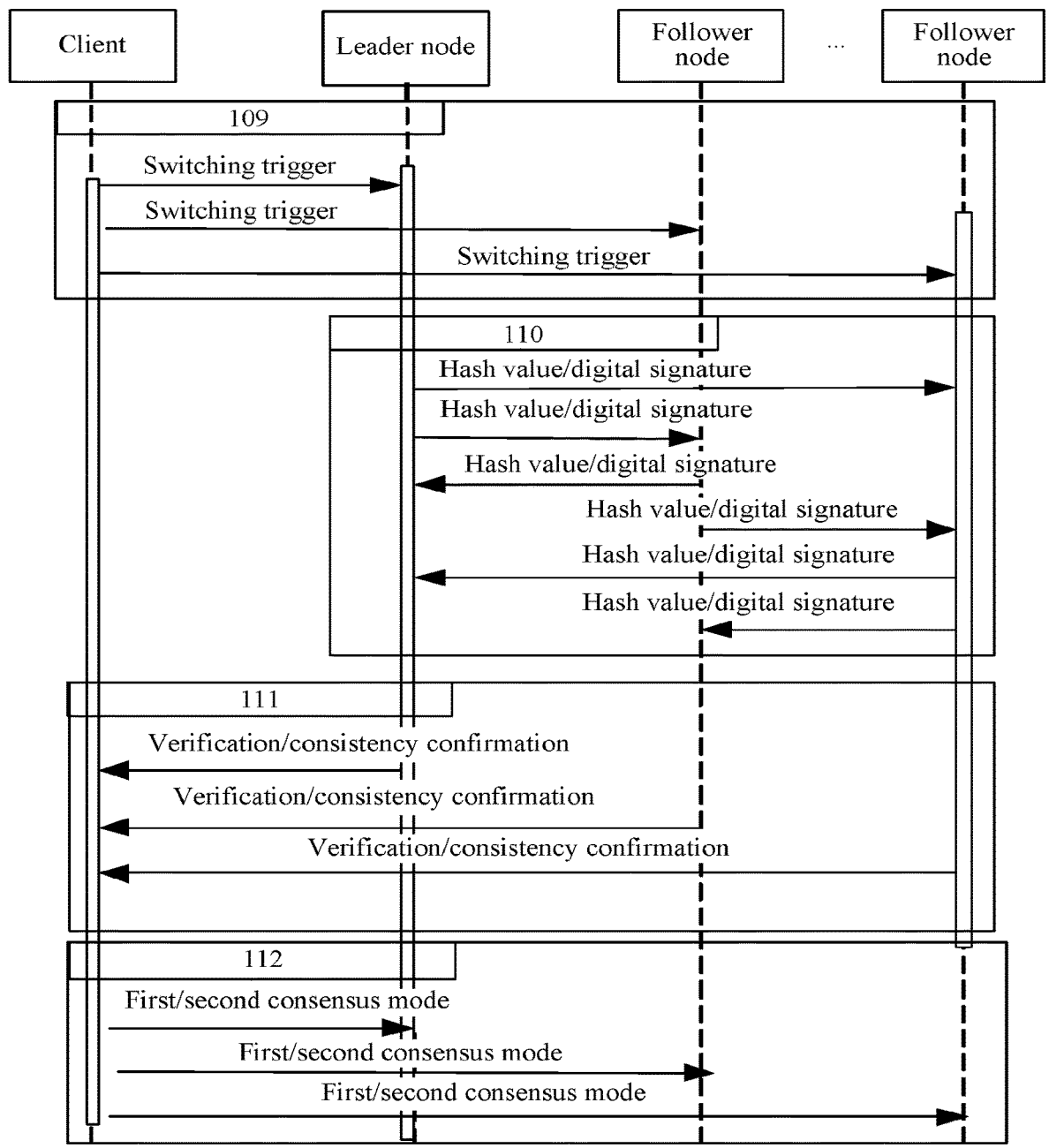
FIG. 6 is an optional schematic flowchart of switching between a first consensus mode and a second consensus mode by a distributed system according to an embodiment of the present disclosure.

FIG. 6 is an optional schematic flowchart of switching between a first consensus mode and a second consensus mode by a distributed system according to an embodiment of the present disclosure. Descriptions are provided with reference to step 109 to step 112.

Step 109: A client triggers, when determining that there is an abnormal node in the distributed system, nodes in the distributed system to switch to the second consensus mode.

When a leader node is a malicious node, or there is a faulty node in follower nodes, or there is an abnormal node in follower nodes, the client broadcasts, to the nodes in the distributed system, a notification of switching to the second consensus mode.

Step 110: A node in the distributed system sends a hash value and a digital signature of a message persistently stored by the corresponding node to other nodes at a preparation stage of switching to the second consensus mode.

Using a node 200 as an example, the node 200 sends a hash value and a digital signature of a message persistently stored by the node 200 to nodes in the distributed system other than the node 200 at the preparation stage of switching to the second consensus mode.

Step 111: A receiving node of a message receives hash values and digital signatures that are sent by all other nodes (that is, all nodes other than the receiving node) in the distributed system; compares, after successfully verifying digital signatures of the hash values, the hash values with a hash value of the message persistently stored by the receiving node; and sends a consistency confirmation to the client if the hash values are all consistent.

For example, a node 1 receiving a notification in the distributed system sends (for example, broadcasts), to nodes 2-N (where N is a quantity of nodes in the distributed system) at the preparation stage of switching to the second consensus mode, a hash value and a digital signature of a message persistently stored in the node. In addition, the node 1 receives hash values sent by the nodes 2-N. The hash values carry digital signatures of corresponding nodes. After successfully verifying the digital signatures, the node 1 compares the hash values sent by the nodes 2-N with the hash value of the message persistently stored by the node 1, and sends a consistency confirmation to the client if all the hash values are consistent.

For the nodes 2-N, processing after receiving hash values is similar to that of the node 1, and details are not described herein again.

Step 112: The client detects whether consistency confirmations of all the nodes are received; and if yes, instructs the nodes in the distributed system to continue to switch to the first consensus mode; or if no, instructs the nodes in the distributed system to continue switching to the second consensus mode.

If the client receives the consistency confirmations sent by all the nodes in the distributed system, it indicates that detection of the abnormal node is caused by network fluctuation or discarding of a response message, and there is no abnormal node in the distributed system. Therefore, the nodes re-switch to the first consensus mode, to ensure consensus reaching efficiency of the nodes.

If the client does not receive, within a pre-determined time, the consistency confirmations sent by all the nodes in the distributed system, it indicates that the abnormal node exists in the distributed system, and the client instructs the nodes in the distributed system to continue switching to the second consensus mode.

Figure 7:
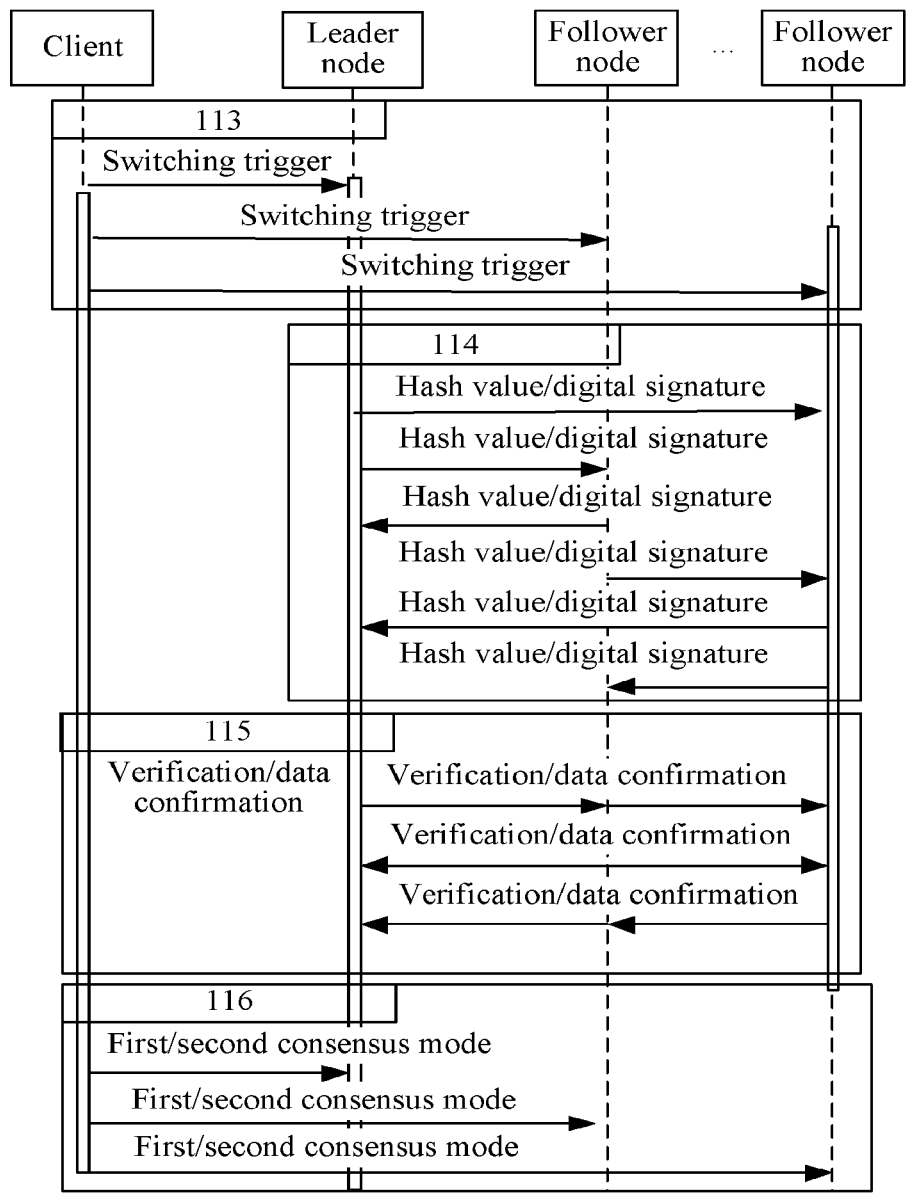
FIG. 7 is an optional schematic flowchart of switching between a first consensus mode and a second consensus mode by a distributed system according to an embodiment of the present disclosure.

FIG. 7 is an optional schematic flowchart of switching between a first consensus mode and a second consensus mode by a distributed system according to an embodiment of the present disclosure. The following steps are included:

Step 113: A client triggers, when determining that there is an abnormal node in the distributed system, nodes in the distributed system to switch to the second consensus mode.

When a leader node is a malicious node, or there is a faulty node in follower nodes, or there is an abnormal node in follower nodes, the client broadcasts, to the nodes in the distributed system, a notification of switching to the second consensus mode.

Step 114: A node in the distributed system sends a hash value and a digital signature of a message persistently stored by the corresponding node to other nodes at a preparation stage of switching to the second consensus mode.

Step 115: A receiving node of the message receives a hash value and a digital signature that are sent by another node in the distributed system; compares, after successfully verifying a digital signature of the hash value, the hash value with a hash value of the message persistently stored by the receiving node; and sends a data confirmation to a sending node of the message if the hash values are consistent.

For example, a node 1 receiving a notification in the distributed system sends (for example, broadcasts), to nodes 2-N (where N is a quantity of nodes in the distributed system) at the preparation stage of switching to the second consensus mode, a hash value and a digital signature of a message persistently stored in the node. In addition, the node 1 receives hash values sent by the nodes 2-N. The hash values carry digital signatures of corresponding nodes. After successfully verifying the digital signatures, the node 1 compares the hash values sent by the nodes 2-N with the hash value of the message persistently stored by the node 1, and sends a data confirmation to each of the node 2 to the node N if all the hash values are consistent.

For the nodes 2-N, processing after receiving hash values is similar to that of the node 1, and details are not described herein again.

Step 116: The client triggers, according to the data confirmation sent by each node, the nodes in the distributed system to return to the first consensus mode or continue switching to the second consensus mode.

For each node in the distributed system, the node broadcasts the hash value of the message persistently stored by the node and the digital signature of the sending node to other nodes. For the receiving node of the hash value, after verifying the digital signature of the received hash value, the receiving node compares the received hash value with a hash value of a message stored by the receiving node, and sends a data confirmation to a sending node of the corresponding hash value when the hash values are consistent. The data confirmation indicates that messages stored by the two nodes are consistent.

Two cases are involved herein:

Case 1: For a receiving node of a data confirmation, if receiving, within the pre-determined time, data confirmations sent by all other nodes (nodes other than the receiving node), the receiving node may send a data confirmation to the client. The client learns, according to the data confirmation, that messages stored by the nodes are consistent, and it is unnecessary to continue switching to the second consensus mode. Therefore, the client may send, to each node in the distributed system, a notification of returning to the first consensus mode, and a process of switching to the second consensus mode ends.

For example, the node 1 sends a hash value to the node 2 to the node N, and the hash value carries a digital signature of the node 1. After the node 2 to the node N−1 successfully verifies the digital signature of the node 1, using the node 2 as an example, the node 2 compares a hash value (where for a node in a block chain system, the hash value may be a hash value of a latest block in a block chain) of a message persistently stored by the node 2 with the hash value sent by the node 1, and sends a data confirmation to the node 1 if the hash values are consistent. Processing performed by the node 3 to the node N−1 is similar to that performed by the node 2.

Assuming that the node 1 receives data confirmations of the node 2 to the node N−1 but does not receive a data confirmation of the node N, the client does not receive a data confirmation of the node 1 within the pre-determined time. Therefore, the client considers that data of the node 1 is not consistent with that of all other nodes, and instructs the node 1 to the node N to continue the operation of switching to the second consensus mode.

Case 2: When no node receives a data confirmation of another node within the pre-determined time, or when the client does not receive a data confirmation of another node because nodes reaching a consensus do not receive, within the pre-determined time, a data confirmation of a node not reaching the consensus, the client instructs the nodes in the distributed system to continue switching to the second consensus mode.

For example, the node 1 sends a hash value to the node 2 to the node N, and the hash value carries a digital signature of the node 1. After the node 2 to the node N−1 successfully verifies the digital signature of the node 1, using the node 2 as an example, the node 2 compares a hash value (where for a node in a block chain system, the hash value may be a hash value of a latest block in a block chain) of a message persistently stored by the node 2 with the hash value sent by the node 1, and sends a data confirmation to the node 1 if the hash values are consistent. Processing performed by the node 3 to the node N−1 is similar to that performed by the node 2.

Assuming that the node 1 receives data confirmations of the node 2 to the node N−1 but does not receive a data confirmation of the node N within the pre-determined time, the node 1 sends, to the client, a notification that the node 1 does not receive data confirmations of all other nodes within the pre-determined time, and the client instructs the node 1 to the node N to continue the operation of switching to the second consensus mode.

For another example, the node 1 sends a hash value to the node 2 to the node N, and the hash value carries a digital signature of the node 1. After the node 2 to the node N−1 successfully verifies the digital signature of the node 1, using the node 2 as an example, the node 2 compares a hash value (where for a node in a block chain system, the hash value may be a hash value of a latest block in a block chain) of a message persistently stored by the node 2 with the hash value sent by the node 1, and sends a data confirmation to the node 1 if the hash values are consistent. Processing performed by the node 3 to the node N−1 is similar to that performed by the node 2.

Assuming that the node 1 receives data confirmations of the node 2 to the node N−1 but does not receive a data confirmation of the node N within the pre-determined time, the node 1 sends, to the client, a notification that the node 1 does not receive data confirmations of all other nodes (that is, nodes in the distributed system other than the node 1), and the client instructs the node 1 to the node N to continue the operation of switching to the second consensus mode.

A manner in which the nodes in the distributed system switch to the second consensus mode and then switch from the second consensus mode back to the first consensus mode continues to be described. For the switching from the second consensus mode back to the first consensus mode, there are the following several manners:

Manner 1: The leader node triggers, when a counted quantity of times that a consensus is reached exceeds a consensus quantity-of-times threshold of the leader node, the follower nodes to switch back to the first consensus mode. The leader node and the follower nodes remain in the node states (that is, the leader node state or the follower node state remains unchanged) in the second consensus mode when switching to the first consensus mode.

When the distributed system is in the second consensus mode, for the leader node (where it may be understood that the leader node herein is specific to a consensus cycle) in the distributed system, if the leader node determines, through counting in the second consensus mode, that the quantity of times that a consensus is reached with the follower nodes on the received message exceeds the consensus quantity-of-times threshold (for example, M times, where M is set according to consensus precision of the nodes in the distributed system, generally, a higher precision requirement indicates a larger pre-determined quantity of times, and there is a positively correlated relationship between the precision requirement and the pre-determined quantity of times) of the leader node, it indicates that the leader node and the follower nodes have reached relatively desirable consensuses on continuous messages from the client. To further improve the consensus reaching efficiency of the nodes in the distributed system, a notification of switching to the first consensus mode may be sent to the follower nodes.

For the follower node in the distributed system, after receiving the notification of switching to the first consensus mode that is sent by the leader node, the follower node sends a switch acknowledgement to the leader node (for acknowledging that the leader node can continue remaining in the leader node state when switching to the first consensus mode). The leader node and the follower node remain in the current node states and switch to the first consensus mode. In this way, a malicious node can be prevented from being the leader node in the first consensus mode, thereby ensuring the consensus efficiency.

It may be understood that the foregoing consensus node quantity threshold may be a quantity of all follower nodes in the distributed system or a minimum value of a quantity of follower nodes used reach the consensus in the distributed system in the first consensus mode (that is, a minimum value of a consensus node quantity used by fault-tolerant performance of the first consensus mode, where after the threshold is less than the minimum value, reliability of a reached consensus in the first consensus mode cannot be ensured).

Similarly, the foregoing consensus node proportion threshold may correspond to the quantity, that is, 100%, of all follower nodes in the distributed system or the minimum value, for example, 51%, of the quantity of follower nodes used to reach the consensus in the distributed system in the first consensus mode (that is, the minimum value of a consensus node quantity used by the fault-tolerant performance of the first consensus mode, where after the threshold is less than the minimum value, the reliability of the reached consensus in the first consensus mode cannot be ensured).

For example, the distributed system is in a second consensus mechanism, assuming that the node 1 is the leader node and the node 2 to the node N are follower nodes, and each node counts consensuses reached on messages from the client, for the node 1, if the node 1 reaches consensuses with the node 2 to the node N on M (the consensus quantity-of-times threshold of the leader node) latest messages from the client, it indicates that the nodes have reached a relatively good consensus with each other. The node 1 broadcasts, to the node 2 to the node N, the notification of switching to the first consensus mode, and the node 2 to the node N send a switch acknowledgement to the node 1 to acknowledge that the node 1 is still the leader node in the first consensus mode and the node 2 to the node N continue serving as the follower nodes. Even though there is a malicious node in the node 2 to the node N, a message from the client cannot be forged, thereby ensuring the consensus reaching efficiency of the nodes.

Manner 2: The leader node determines, through counting, that a quantity of times that a consensus is reached exceeds a consensus quantity-of-times threshold of the leader node, and triggers the follower nodes to switch back to the first consensus mode. When determining, through counting, that a consensus reaching quantity-of-times threshold exceeds a consensus quantity-of-times threshold of the follower node, the follower node determines to switch back to the first consensus mode. The leader node and the follower nodes remain in the node states in the second consensus mode (that is, the leader node state or the follower node state remains unchanged) when switching to the first consensus mode.

When the distributed system is in the second consensus mode, the leader node counts a quantity of times that a consensus is reached with other nodes (including the leader node and other follower nodes) on messages from the client in the second consensus mode; and if the quantity of times that a consensus is reached exceeds a consensus quantity-of-times threshold of the follower node (which may be less than or equal to the consensus quantity-of-times threshold of the leader node, and for example, may be M/2), sends, to the leader node, a notification of agreeing that the leader node continues serving as the leader node in the first consensus mode and the follower nodes in the second consensus mode continue serving as the follower nodes when switching to the first consensus mode, to complete a voting operation for switching to the first consensus mode and continue reaching a consensus on a message from the client in the first consensus mode. In this way, a malicious node can be prevented from becoming the leader node in the first consensus mode, thereby ensuring the consensus efficiency.

After the nodes in the distributed system switch to the first consensus mode, if no abnormal node is detected in the first consensus mode, the nodes continue remaining in the first consensus mode, and the nodes re-switch to the second consensus mode if a relatively desirable consensus still cannot be reached (where for example, a malicious node, an abnormal node, or an erroneous node can still be detected) after the nodes return to the first consensus mode.

A pre-determined quantity/proportion herein may be understood according to the foregoing descriptions, and details are not described herein again.

For example, the leader node in the distributed system may synchronously start timing based on a timer after switching to the second consensus mode; and after a timing time reaches a timing time threshold (for example, 10 minutes), triggers the follower nodes in the distributed system to synchronously switch back to the first consensus mode. A voting operation is performed in the first consensus mode to determine a new leader node and new follower nodes. If an abnormal node is still detected after the switching to the first consensus mode, the nodes switch back to the second consensus mode again (where a manner of switching to the first consensus mode may be understood according to the foregoing descriptions). Therefore, the consensus reaching efficiency of the distributed system is maximally improved when a consensus is reached in the second consensus mode to ensure the fault-tolerant performance of the distributed system.

A pre-determined quantity/proportion herein may be understood according to the foregoing descriptions, and details are not described herein again.

For example, the distributed system is in a second consensus mechanism. Assuming that the node 1 is the leader node and the node 2 to the node N are follower nodes, and each node counts consensuses reached on messages from the client. For the node 1, if the node 1 reaches consensuses with the node 2 to the node N on M (the consensus quantity-of-times threshold of the leader node) latest messages from the client, it indicates that the nodes have reached a relatively desirable consensus, and the node 1 broadcasts, to the node 2 to the node N, a notification of switching to the first consensus mode. For the node 2 to the node N, using the node 2 as an example, the node 2 counts a quantity of times that a consensus is reached in the second consensus mode; and if the quantity of times exceeds M/2, sends a switch acknowledgement to the node 1 (for acknowledging that the node 1 still serves as the leader node when switching to the first consensus mode and the node 2 serves as the follower node). Processing of the node 3 to the node N is similar to that of the node 2, and details are not described herein again.

When the node 1 receives a switch acknowledgement sent by each of the node 2 to the node N, the nodes switch to the first consensus mode, and the node 1 serves as the leader node and the node 2 to the node N serve as follower nodes in the first consensus mode. If the node 1 does not receive a switch acknowledgement sent by each of the node 2 to the node N, the nodes continue remaining in the second consensus mode, and the node 1 continues sending, to the node 2 to the node N at intervals of M/2 quantity of times of consensuses, a notification of switching to the first consensus mode, until switch acknowledgements of the node 2 to the node N are all received.

An example in which a block chain system (for example, a consortium chain system maintained to open to an individual person or entity) reaches a consensus by using an improved RAFT (T-RAFT) algorithm in the first consensus mode and by using a PBFT algorithm in the second consensus mode is used below. It may be understood that a Paxos may further be used in the first consensus mode, and a BFT algorithm, a BFT-RAFT algorithm, and the like may further be used in the second consensus mode. Any algorithm such as the T-RAFT algorithm that can achieve high consensus efficiency and can be used for detecting a node fault or a Byzantine node may be used in the first consensus mode, and any algorithm that can implement Byzantine fault tolerance may be used in the second consensus mode.

The RAFT algorithm provided in the related technology resolves a problem of data consistency of a plurality of nodes, but cannot implement the Byzantine fault tolerance. However, the RAFT algorithm has relatively high efficiency. The PBFT algorithm can implement the Byzantine fault tolerance. However, a message needs to be broadcast between nodes in the PBFT algorithm, resulting in relatively low implementation efficiency.

In a usage scenario in which a distributed network is applied to a federal chain (a block chain open to an individual person or entity), generally, there is no node fault or Byzantine node problem in a block chain system in most of time, and a consensus between nodes can be efficiently reached by using the RAFT algorithm.

The RAFT algorithm provided in the related technology implements consistency of a plurality of nodes and has relatively high efficiency, but does not implement the Byzantine fault tolerance between nodes, and the PBFT algorithm can ensure the consistency between a plurality of nodes and implement the Byzantine fault tolerance between nodes. Therefore, in the embodiments of the present disclosure, the PBFT algorithm can be automatically used to implement the consensus between the nodes, provided that there is a node fault or a Byzantine problem. When all the nodes reach the consensus, that is, there is no Byzantine node, the RAFT algorithm having relatively high consensus efficiency is then automatically switched to, to implement the consensus between the nodes.

Figure 8:
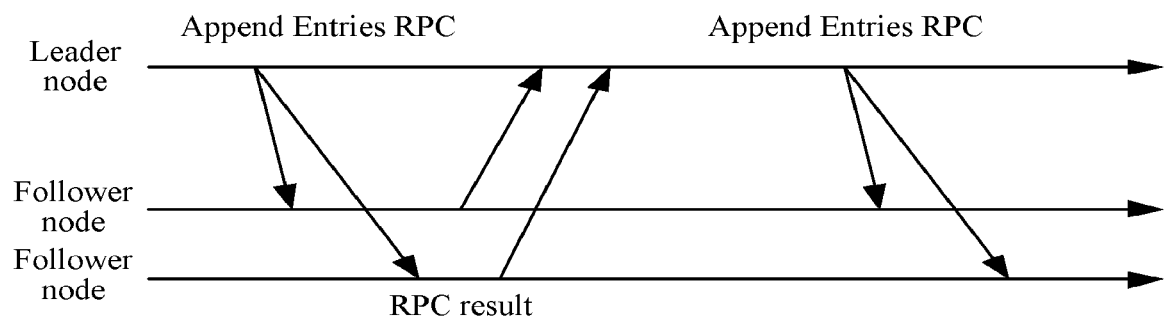
FIG. 8 is an optional schematic flowchart of reaching a consensus by a block chain system by using a RAFT algorithm according to an embodiment of the present disclosure.

FIG. 8 is an optional schematic flowchart of reaching a consensus by a block chain system by using a RAFT algorithm according to an embodiment of the present disclosure. After a client sends messages to a leader node, the leader node sorts the received messages, and delivers the messages to follower nodes in the sorting order. Other follower nodes store the messages to logs in an order organized by the leader node, and each return a RPC result to the leader node. Then, after storing the messages in logs to a local disk, the leader node sends a Commit to each follower node. Each follower node stores the logs in the messages to a local disk of the follower node, and consistency synchronization of the message is completed. This results in relatively high efficiency but cannot resolve the problem of the Byzantine node.

Figure 9:
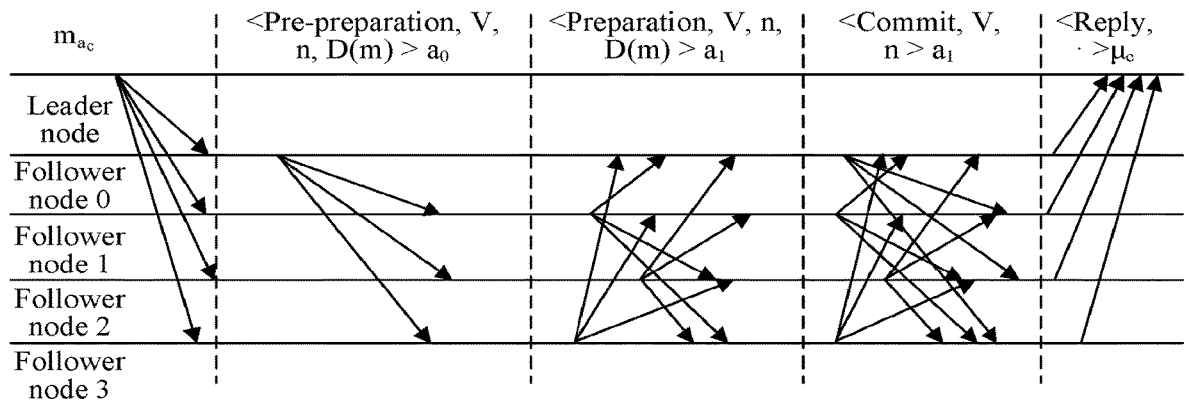
FIG. 9 is an optional schematic flowchart of reaching a consensus by a block chain system by using a PBFT algorithm according to an embodiment of the present disclosure.

FIG. 9 is an optional schematic flowchart of reaching a consensus by a block chain system by using a PBFT algorithm according to an embodiment of the present disclosure. A message needs to be actually confirmed after being broadcast twice. Due to dependency on broadcasting, a quantity of messages sent in a consensus reaching process is on the square class of a quantity of nodes. Therefore, the consensus reaching efficiency is relatively low, but the Byzantine fault tolerance between the nodes can be implemented.

The RAFT algorithm can implement consistency and has high efficiency, but cannot implement the Byzantine fault tolerance, and therefore is not adopted in scenarios of many block chain systems. The PBFT algorithm that has lower efficiency but can implement the Byzantine fault tolerance can be adopted. Features, to be specific, a network condition is desirable, there is no Byzantine node in most cases, a consensus between a plurality of nodes is to be reached, in an application scenario of a federal chain is fully used in the embodiments of the present disclosure. In combination with the advantages of high efficiency of the RAFT algorithm and the fault tolerance of the PBFT algorithm, an adaptive consensus algorithm that is efficient and that can implement the Byzantine fault tolerance is provided.

In a block chain system applied to a federal chain, a quantity of nodes participating in the consensus is limited, and there is no Byzantine node in the participating nodes in most cases, provided that data consistency is ensured. In this case, the T-RAFT algorithm having higher efficiency is used. When there is an exception, for example, when there is a Byzantine fault tolerance requirement between nodes or there is a node fault, the exception can be detected in time and the PBFT algorithm that can support the Byzantine fault tolerance is automatically switched to. When all nodes reach a consensus in the PBFT algorithm, the T-RAFT algorithm having higher efficiency is then automatically switched to. In this way, in most cases, that is, when the network is desirable and there is no Byzantine node, a requirement of the federal chain on a efficient consensus can be satisfied, and correction and fault tolerance can be implemented in real time when there is an abnormal node.

Figure 10:
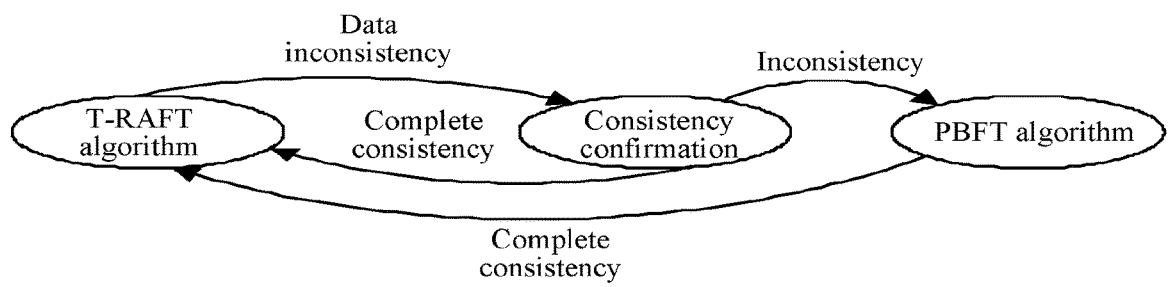
FIG. 10 is a diagram of an operating status of implementing an adaptive consensus algorithm according to an embodiment of the present disclosure.

To implement automatic switching between consensus algorithms, FIG. 10 is a diagram of an operating status implementing an adaptive consensus algorithm according to an embodiment of the present disclosure. The block chain system reaches a consensus in the T-RAFT algorithm by default. When it is detected by using the T-RAFT algorithm that a quantity of nodes whose data is inconsistent is less than a threshold (a quantity of all nodes or a pre-determined proportion of nodes, which is set according to fault tolerant performance of the T-RAFT algorithm), the block chain system enters a data (message) consistence confirmation state: if it is confirmed that data of the nodes is consistent, the T-RAFT algorithm is still used; or if data of nodes is inconsistent, the PBFT algorithm is switched to, to implement the consensus between the nodes. When it is detected during operation of the PBFT algorithm, that data of all the nodes is consistent, the T-RAFT algorithm is then switched back to.

Figure 11:
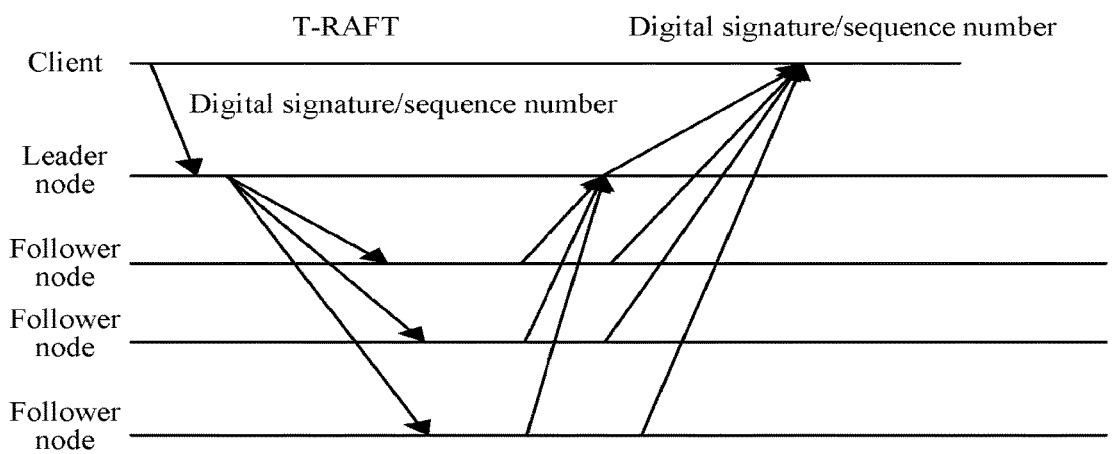
FIG. 11 is a schematic diagram of implementation of a T-RAFT algorithm consensus according to an embodiment of the present disclosure.

The T-RAFT algorithm is improvement of the RAFT algorithm, and can prevent a node from tampering, replaying, or forging a message and find a malicious node in time. FIG. 11 is a schematic diagram of implementation of a T-RAFT algorithm consensus according to an embodiment of the present disclosure. Compared with the RAFT algorithm, improvement is mainly related to the following several aspects:

1. A message sent by a client carries a digital signature of a message entity for the message. In this way, the message can be prevented from being modified in a transmission process. In addition, the message carries a uniqueness field, to prevent the message from being replayed after being intercepted.

2. A message transmitted between nodes carries a digital signature of a sender, and a receiving node of the message verifies correctness of the digital signature. In this way, a new node can be prevented from being forged to participate in a voting operation or a node is prevented from disguised as a leader node to send a fake message to follower nodes.

3. After the client requests the leader node, and after all follower nodes receive a message sent by the leader node in a process of synchronizing the message to the follower nodes by the leader node in a T-RAFT consensus mode, the follower nodes each return a result to the client in addition to completing an original RAFT message procedure. The returned result carries a uniqueness field of the message and a digital signature of the follower node. In this way, the client can determine data (message) consistency of the nodes by comparing whether results returned by all the nodes are consistent. If the results received by the client are not consistent, or the client does not receive results of all the nodes within a pre-determined time, it is determined that there is a Byzantine node or there is a faulty node, and a data consistency confirmation procedure is triggered.

The data consistency confirmation process happens at a middle stage of consensus algorithm switching, and a data recovery process is actually a consensus process in which the minority is subordinate to the majority. The consensus process is performed through message broadcasting. Specifically, the node uses the T-RAFT algorithm by default. When there is an erroneous node or a Byzantine node, the client can find out data inconsistency by comparing the results returned by the nodes, to determine whether algorithm switching is used.

For example, if a consensus mode of the PBFT algorithm needs to be switched to, the client broadcasts, to all the nodes, a notification of switching to the PBFT algorithm. When the node receives the consensus algorithm switching notification and is at a preparation stage, the node broadcasts a data request acknowledgement message to all other nodes. The data request acknowledgement message carries a hash value of a block of a latest consensus in a block chain of the node and a digital signature of the node.

A node receiving the data request acknowledgement message, which is referred to as a receiving node herein, checks whether a hash value of a block of a latest consensus in a block chain of the node is consistent with the hash value carried in the data request acknowledgement message, and verifies correctness of the digital signature of the node. For the receiving node, if the receiving node receives data request acknowledgement messages of all other nodes, and these data request acknowledgement messages include correct signatures and hash values consistent with the hash value of the block of the latest consensus of the receiving node, the receiving node replies a data consistency confirmation to the client. The data consistency confirmation carries a digital signature of the receiving node.

Figure 12:
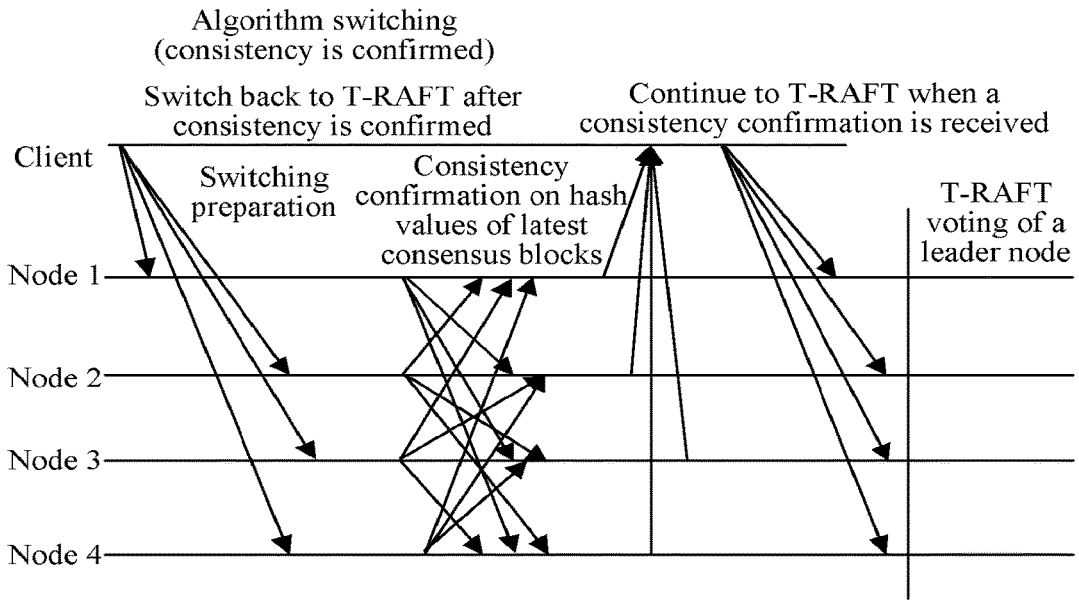
FIG. 12 is an optional schematic flowchart of switching back to a T-RAFT algorithm at a preparation stage of switching to a PBFT algorithm according to an embodiment of the present disclosure.

If receiving data consistency confirmations of all the nodes, the client considers that data of block chains maintained by the nodes is consistent and a data consistency comparison failure before the algorithm switching request is caused by network fluctuation or discarding of a response message, and therefore re-switches to the T-RAFT algorithm. For a specific procedure, refer to the following message flowchart:

In an example, FIG. 12 is an optional schematic flowchart of switching back to a T-RAFT algorithm at a preparation stage of switching to a PBFT algorithm according to an embodiment of the present disclosure. In FIG. 12, nodes 1, 2, 3, and 4 all receive broadcast messages of data consistency confirmations from other nodes, and confirm that hash values of blocks of latest consensuses of the nodes are consistent. The nodes each return a data consistency confirmation to the client, and each return to a state of the T-RAFT algorithm. Even though not receiving a notification of the client of re-switching to the T-RAFT algorithm, the nodes also enter a voting procedure of the T-RAFT algorithm after a timeout time expires.

If the client does not receive data consistency confirmations from all the nodes within a timeout time, or consensus nodes (that is, hash values of latest blocks in the block chain system are consistent) do not receive broadcast messages of data consistency confirmations from all other nodes, the client instructs all the nodes to switch to the PBFT algorithm.

In addition, for any node, if not receiving broadcast messages of data consistency confirmations of all other nodes, the node automatically enters a PBFT algorithm state, and broadcasts a notification of switching to the PBFT algorithm.

After a node receives at least f+1 new algorithm broadcast messages (where f is a maximum value of a quantity of erroneous nodes allowed in the block chain system according to the PBFT algorithm), the node starts initiating a voting, also referred to as a view change, of a leader node in a new algorithm (PBFT), and enters a consensus stage of the new PBFT algorithm after completing the voting.

Figure 13:
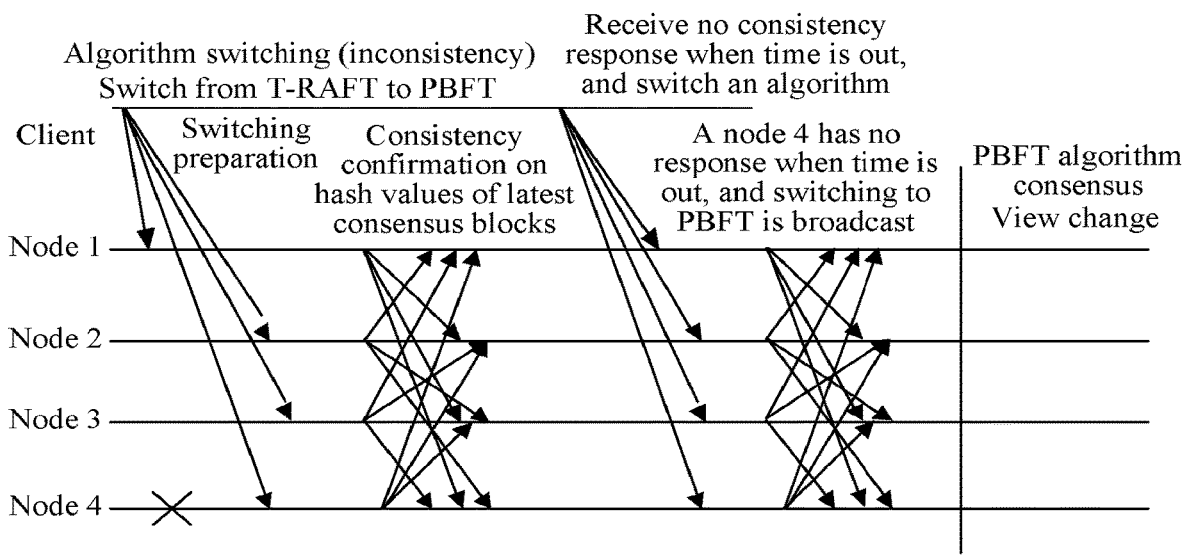
FIG. 13 is an optional schematic flowchart of switching from a T-RAFT algorithm consensus to a PBFT algorithm consensus by a block chain system according to an embodiment of the present disclosure.

FIG. 13 is an optional schematic flowchart of switching from a T-RAFT algorithm consensus to a PBFT algorithm consensus by a block chain system according to an embodiment of the present disclosure. In the schematic flowchart of a message, assuming that a node 4 is faulty, when nodes 1, 2, and 3 receive an algorithm switching notification of a client to be at a preparation stage of switching to the PBFT algorithm, the nodes 1, 2, and 3 each broadcast a data request acknowledgement message. The message carries a hash value of a block of a latest consensus of the node. The node 4 is faulty, and the nodes 1, 2, and 3 do not receive, within a timeout time, a data consistency confirmation (a consistency response) broadcast by the node 4, and therefore do not send a data consistency confirmation to the client. After the timeout, the nodes 1, 2, and 3 and the client all broadcast a notification of switching to the PBFT algorithm. A quantity of algorithm switching notifications that are received by the nodes 1, 2, and 3 is greater than f+1. A node first receiving f+1 algorithm switching notifications first initiates a view change procedure. After the view change is completed, a PBFT algorithm consensus mode is entered.

In a PBFT consensus, once determining, through counting, that data is consistent for consecutive M (configurable) times, the leader node converts into a T-RAFT competitive node, and triggers a T-RAFT voting process. After receiving a voting request, other nodes agree the competitive node to convert into the leader node, provided that the other nodes also determine, through counting, that a quantity of times of consecutive consensuses is greater than M/2 or greater than a fixed configured value T. When all follower nodes agree the competitive node to convert into the leader node, a consensus mode of the T-RAFT algorithm is entered, and the quantity of times of consecutive consensuses of each node is zeroed out. The competitive node recovers to an original state immediately, that is, converts into the leader node in the PBFT algorithm, provided that there is a follower node not agreeing the competitive node to convert into the leader node, and continues executing the PBFT algorithm. The quantity of times of consensuses counted by each node continues being accumulated, and a T-RAFT voting is triggered again until the quantity of times is M+T. If the T-RAFT voting fails, a T-RAFT voting is triggered next time at a time point M+2T. The rest can be deduced by analogy, and a T-RAFT voting is triggered at a time point M+x*T until the leader node is successfully voted. x is the quantity of times.

Figure 14:
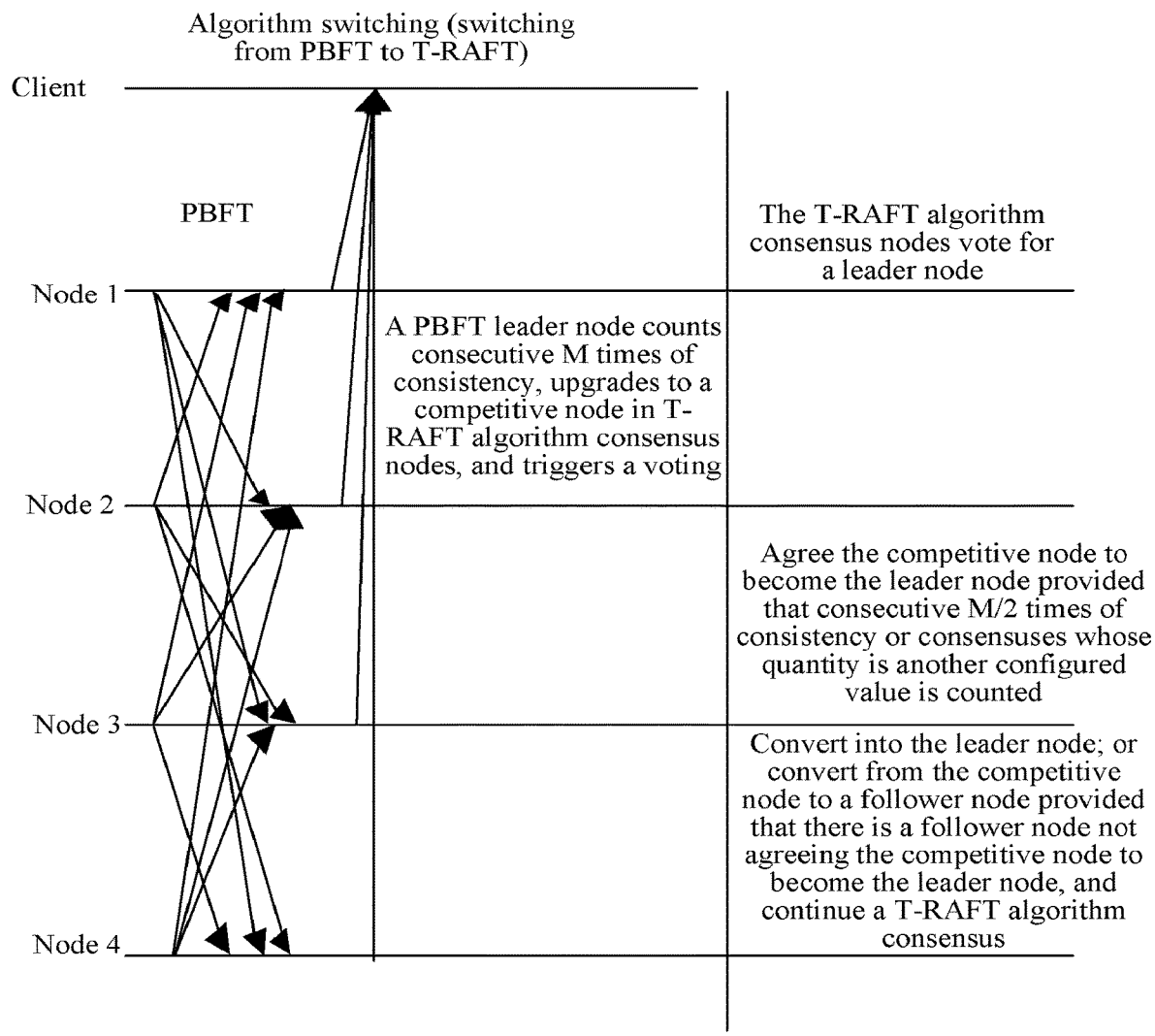
FIG. 14 is an optional schematic flowchart of switching from a PBFT algorithm consensus mode to a T-RAFT algorithm consensus mode by a block chain system according to an embodiment of the present disclosure.

FIG. 14 is an optional schematic flowchart of switching from a PBFT algorithm consensus mode to a T-RAFT algorithm consensus mode by a block chain system according to an embodiment of the present disclosure. In a PBFT algorithm process, when the leader node, that is, a node 1, determines, through counting, that a quantity of times that data is continuously consistent (consensuses) exceeds M times, the node 1 converts into a T-RAFT competitive node state, and then initiates a voting of the T-RAFT algorithm. After receiving a voting request (request vote) message, nodes 2, 3, and 4 determine whether a quantity of times that data is continuously consistent that is greater than M/2 (or a fixed value T) is also counted, and if yes, return a switch acknowledgement for agreeing the competitive node to convert into the leader node.

The competitive node receives the switch acknowledgements of the nodes 2, 3, and 4, converts into the leader node, and starts a T-RAFT algorithm consensus stage. In a T-RAFT voting process, after receiving a message of the client, the leader node (the node 1) in an original PBFT consensus mode no longer sends a sequencing message, for example, a pre-preparation message in the PBFT algorithm, and after the voting completes, attaches the message to an Append Entries RPC in the T-RAFT algorithm to send the Append Entries RPC to follower nodes.

Figure 15:
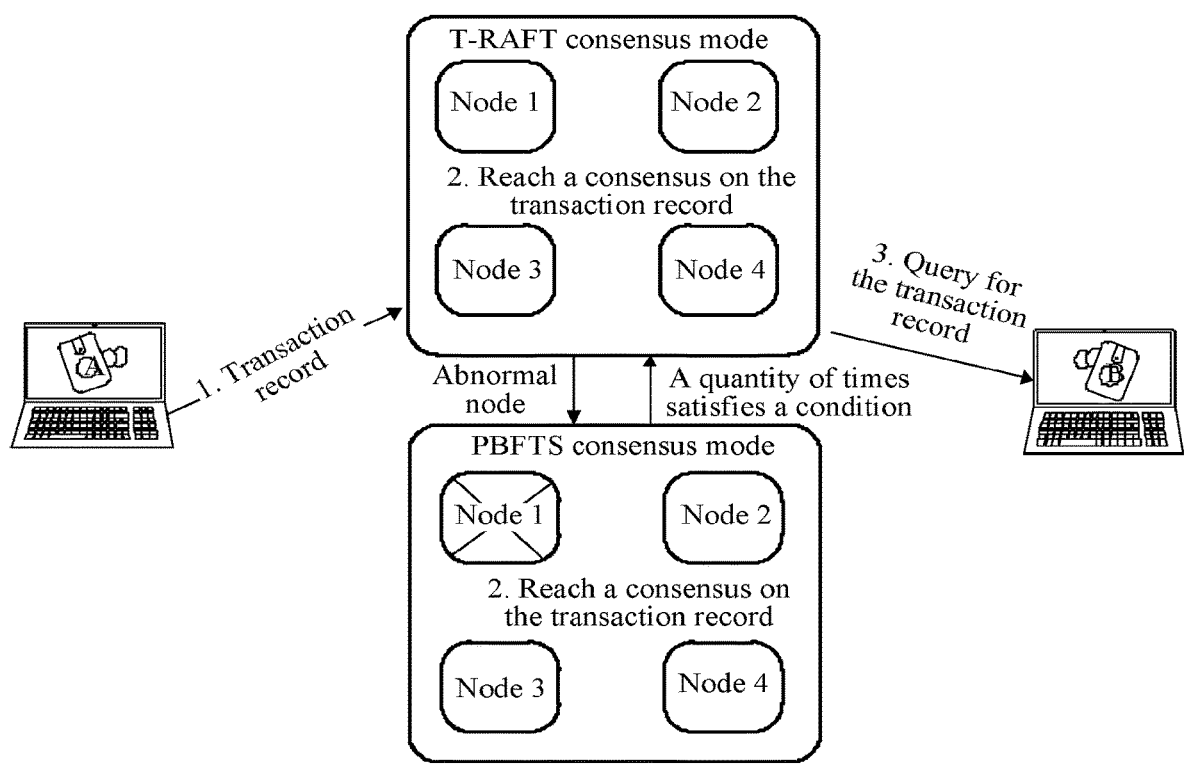
FIG. 15 is an optional schematic diagram of a scenario in which a distributed system is applied to a federal chain system according to an embodiment of the present disclosure.

Descriptions are further provided with reference to a usage scenario in an actual application. FIG. 15 is an optional schematic diagram of a scenario in which a distributed system is applied to a federal chain system according to an embodiment of the present disclosure. The federal chain system is open to an individual person or entity and includes a plurality of nodes. Each node provide access for a third-party payment institution and a bank service system (as a client), and receives transaction records committed by the third-party payment institution and the bank service system. After reaching a consensus on a committed transaction record, the node stores the transaction record in a latest block of a block chain, so that the third-party payment institution and the subscribed bank perform account reconciliation according to corresponding service turnover.

The node reaches the consensus on the transaction record in the T-RAFT consensus mode by default, and switches to a PBFT consensus mode when there is an abnormal node to reach the consensus on the transaction record.

A third-party payment terminal of a user is bound to a credit card account of the user in a bank. When the user trades with a merchant offline or online, the third-party payment terminal may transfer money from the credit card account of the user to an account of the merchant through pre-obtained pre-authorization of the credit card account, to form a transaction record.

For this transaction, a service system of the third-party payment institution commits a transaction record (for example, including a payee, a payer, and a payment amount, and carrying a digital signature of the third-party payment client) to the accessed leader node in the distributed system. After successfully verifying the digital signature of the received transaction record, the leader node synchronizes the transaction record to other follower nodes (where the transaction record carries a digital signature of the leader node). After successfully verifying the digital signature of the transaction record, the follower node returns a result (carrying a digital signature of the follower node and a uniqueness field, and further carrying a sequence number of the transaction record when the leader node is a newly voted leader node) to the service system of the third-party payment institution, and notifies the leader node that synchronization is completed. After confirming that each follower node completes the synchronization, the leader node stores the transaction record in a latest block of a block chain and notifies the follower node. The follower node performs the same operation, to persistently store the transaction record.

For the foregoing consensus process for the transaction record, if determining, according to the result returned by the follower node, that the leader node is a malicious node or the follower node is faulty, the client triggers the federal chain system to switch to the PBFT consensus mode to reach the consensus on the transaction record, to ensure that the transaction record can be successfully stored in the block chain of each node; and may switch back to the T-RAFT consensus mode according to a consensus case, for example, that a relatively good formula (where the leader node and other nodes reach consensuses for consecutive M times) is obtained, of the federal chain system on a transaction record subsequently committed by the service system of the third-party payment institution, to improve consensus efficiency.

In conclusion, the embodiments of the present disclosure have the following beneficial effects:

(1) Reliability of communication between the client and the nodes and between nodes is ensured by using digital signatures, to avoid message forging and ensure reliability of communication inside the distributed system.

(2) The follower node directly returns the result to the client when receiving the message sent by the leader node, and adds information such as the uniqueness field, the sequence number of the message, and the digital signature to the result, so that the client can directly determine consensus reaching of the follower nodes according to the result returned by the follower node, thereby easily detecting the abnormal node.

(3) When an abnormal node is detected, the default first consensus mode with higher consensus efficiency can be switched to the second consensus mode with better fault-tolerant performance, to ensure that the consensus of the distributed system can be successfully reached when an exception occurs.

(4) Once a good consensus (for example, determined based on a quantity of times of consensuses) is reached in the second consensus mode, the first consensus mode is switched to again. This adaptive consensus mode switching implements optimal combination between the consensus efficiency and the fault-tolerant performance. The technical effect of high consensus efficiency is achieved in most time when a running network status of the distributed network is desirable, and normal processing of a service function of the distributed system is ensured when there is a faulty node or a Byzantine node.

A person skilled in the art may understand that all or some of the steps in the foregoing method embodiments may be implemented by a program instructing relevant hardware. The program may be stored in a computer-readable storage medium. The program, when executed, performs the steps in the foregoing method embodiments. The foregoing storage medium includes a medium, such as a mobile storage communication status processing apparatus, a random access memory (RAM), a read-only memory (ROM), a magnetic disk, or a compact disc, that can store program code.

Alternatively, when the integrated module in the present disclosure is implemented in the form of a software function module and sold or used as an independent product, the integrated module may be stored in a computer readable storage medium. According to such an understanding, the technical solutions of the embodiments of the present disclosure essentially, or the part contributing to the related technology may be implemented in a form of a software product. The computer software product is stored in a storage medium, and includes several instructions for instructing a computer communication status processing apparatus (which may be a personal computer, a server, a network communication status processing apparatus, or the like) to perform all or some of the steps of the methods described in the embodiments of the present disclosure. The foregoing storage medium includes various media, such as a mobile storage communication status processing apparatus, a RAM, a ROM, a magnetic disc, and a compact disc, that can store program code.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A client device with a digital signature, comprising: processing circuitry configured to:
send a message to be stored in nodes after the nodes reach a consensus on the message, the message including the digital signature of the client device;
obtain, by the processing circuitry of the client device, results from a subset of the nodes that receive the message, the results having respective digital signatures of the subset of the nodes, the nodes including a leader node and follower nodes and being in a first consensus mode for reaching the consensus on the message;
after verifying the digital signatures of the subset of the nodes, determine, by the processing circuitry of the client device, based on the results, whether one or more of the nodes has malfunctioned; and
based on the one or more of the nodes being determined to be malfunctioned,
trigger, by the processing circuitry of the client device, the nodes to switch from the first consensus mode to a second consensus mode, the first consensus mode and the second consensus mode corresponding to different consensus algorithms; and
determine, by the processing circuitry of the client device, a leader node from the nodes for the second consensus mode after the nodes are switched to the second consensus mode.

2. The client device according to claim 1, wherein:
the message from the client device further includes first unique information;
the subset is of the follower nodes;
each of the results includes second unique information; and
the processing circuitry is further configured to:
for each of the follower nodes,
determine whether the respective follower node is an erroneous node based on a determination that the second unique information in the result sent by the respective follower node is different from the first unique information in the message from the client device; and
determine that the respective follower node is a faulty node when a result is not received from the respective follower node.

3. The client device according to claim 2, wherein
the message from the client device includes a first sequence number;
each of the results includes a second sequence number; and
the processing circuitry is further configured to:
for each of the follower nodes, determine that the respective follower node sends an inconsistent sequence number when the second sequence number is different from the first sequence number; and
determine that the leader node is a malicious node when a number of the follower nodes sending the inconsistent sequence numbers exceeds a threshold.

4. The client device according to claim 3, wherein the processing circuitry is further configured to:
trigger the nodes to switch from the first consensus mode to the second consensus mode when the processing circuitry determines at least one of: the leader node is the malicious node, at least N of the follower nodes are the faulty nodes, or at least M of the follower nodes are the erroneous nodes, N and M being positive integers.

5. A distributed system, comprising:
the client device according to claim 4, and
the nodes, wherein
each of the nodes is configured to:
after receiving the trigger from the processing circuitry to switch to the second consensus mode,
send a hash value in a message stored by the respective node and a digital signature of the respective node to other nodes in the distributed system;
receive hash values in messages from the other nodes;
determine whether the hash value stored by the respective node is consistent with the hash values from the other nodes; and send a consistency confirmation to the client device when the hash value stored by the respective node is determined to be consistent with the hash values from the other nodes.

6. The distributed system according to claim 5, wherein the processing circuitry of the client device is further configured to:
determine whether the consistency confirmation from each of the nodes is received;
when the client device does not receive the consistency confirmation from at least one of the nodes within a pre-determined time, notify the nodes to switch to the second consensus mode; and
when the client device receives the consistency confirmation from each of the nodes within the pre-determined time, notify the nodes to switch to the first consensus mode.

7. A distributed system, comprising:
the client device according to claim 4, and
the nodes, wherein
each of the nodes is configured to:
after receiving the trigger to switch to the second consensus mode,
send a hash value in a message stored by the respective node and a digital signature of the respective node to other nodes in the distributed system;
receive another hash value in a message from one of the other nodes;
determine whether the hash value stored by the node is consistent with the other hash value from the one of the other nodes;
send a data confirmation to the one of the other nodes when the hash value of the respective node is determined to be consistent with the other hash value, the data confirmation including the digital signature of the respective node and indicating that the message stored by the respective node is consistent with the message from the one of the other nodes; and
when the respective node receives the data confirmation from each of the other nodes, send a data confirmation to the client device.

8. The distributed system according to claim 7, wherein the processing circuitry is further configured to:
determine whether the message stored in the respective node is consistent with the messages stored in the other nodes based on the data confirmation from the respective node;
when each of the data confirmations from the nodes to the client device is received within a pre-determined time, notify the nodes to switch back to the first consensus mode; and
terminate switching to the second consensus mode; and
when at least one of the data confirmations from the nodes to the client device is not received within the pre-determined time, notify the nodes to switch to the second consensus mode.

9. A distributed system, comprising:
the client device according to claim 4; and
the nodes, wherein
the leader node is configured to:
switch the nodes to the first consensus mode when a number of times that the nodes reach the consensus on the received message from the client device in the second consensus mode exceeds a first consensus threshold of the leader node.

10. The distributed system according to claim 9, wherein one of the follower nodes is configured to:

count a number of times that the consensus is reached on the received message when receiving a notification to switch to the first consensus mode; and
send a switch acknowledgement to the leader node when the counted number of times exceeds a second consensus threshold of the one of the follower nodes.

11. A message processing method, comprising:
sending, by processing circuitry of a client device with a digital signature, a message to be stored in nodes after the nodes reach a consensus on the message, the message including the digital signature of the client device;
obtaining, by the processing circuitry of the client device, results from a subset of the nodes that receive the message, the results having respective digital signatures of the subset of the nodes, the nodes including a leader node and follower nodes and being in a first consensus mode for reaching the consensus on the message;
after verifying the digital signatures of the subset of the nodes, determining, by the processing circuitry of the client device, based on the results, whether one or more of the nodes has malfunctioned; and
based on the one or more of the nodes being determined to be malfunctioned,
triggering, by the processing circuitry of the client device, the nodes to switch from the first consensus mode to a second consensus mode, the first consensus mode and the second consensus mode corresponding to different consensus algorithms; and
determining, by the processing circuitry of the client device, a leader node from the nodes for the second consensus mode after the nodes are switched to the second consensus mode.

12. The message processing method according to claim 11, wherein
the message from the client device further includes first unique information;
the subset is of the follower nodes;
each of the results includes second unique information; and
the message processing method further includes:
for each of the follower nodes,
determining, by the processing circuitry, whether the respective follower node is an erroneous node based on a determination that the second unique information in the result sent by the respective follower node is different from the first unique information in the message from the client device; and
determining, by the processing circuitry, that the respective follower node is a faulty node when a result is not received from the respective follower node.

13. The message processing method according to claim 12, wherein
the message from the client device includes a first sequence number;
each of the results includes a second sequence number; and
the message processing method further includes:
each of the follower node, determining, by the processing circuitry, that the respective follower node sends an inconsistent sequence number when the second sequence number is different from the first sequence number; and determining, by the processing circuitry, that the leader node is a malicious node when a number of the follower nodes sending the inconsistent sequence numbers exceeds a threshold.

14. The message processing method according to claim 13, further comprising:
triggering, by the processing circuitry, the nodes to switch from the first consensus mode to the second consensus mode when the processing circuitry determines at least one of: the leader node is the malicious node, at least N of the follower nodes are the faulty nodes, or at least M of the follower nodes are the erroneous nodes, N and M being positive integers.

15. The message processing method according to claim 14, further comprising:
after receiving the trigger from the processing circuitry to switch to the second consensus mode,
sending, by each of the nodes, a hash value in a message stored by the respective node and a digital signature of the respective node to other odes;
receiving, by the respective node, hash values in messages from the other nodes;
determining, by the respective node, whether the hash value stored by the respective node is consistent with the hash values from the other nodes; and
sending, by the respective node to the client device, a consistency confirmation when the hash value stored by the respective node is determined to be consistent with the hash values from the other nodes.

16. The message processing method according to claim 15, further comprising:
determining, by the processing circuitry, whether the consistency confirmation from each of the nodes is received;
when the client device does not receive the consistency confirmation from at least one of the nodes within a pre-determined time, notifying the nodes to switch to the second consensus mode; and
when the client device receives the consistency confirmation from each of the nodes within the pre-determined time, notifying the nodes to switch to the first consensus mode.

17. The message processing method according to claim 14, further comprising:
after receiving the trigger to switch to the second consensus mode from the client device,
sending, by each of the nodes, a hash value in a message stored by the node and a digital signature of the node to other nodes;
receiving another hash value in a message from one of the other nodes;
determining whether the hash value stored by the node is consistent with the other hash value from the one of the other nodes;
sending a data confirmation to the one of the other nodes when the hash value of the respective node is determined to be consistent with the other hash value, the data confirmation including the digital signature of the respective node and indicating that the message stored by the node being consistent with the message from the one of the other nodes; and
when the respective node receives each data continuation from each of the other nodes, sending a data confirmation to the client device.

18. The message processing method according to claim 17, further comprising:
determining whether the message stored in the respective node is consistent with the messages stored in the other nodes based on the data confirmation from the respective node;
when each of the data confirmations from the nodes to the client device is received within a pre-determined time, notifying the nodes to switch back to the first consensus mode; and
terminating switching to the second consensus mode; and
when at least one of the data confirmations from the nodes to the client device is not received within the pre-determined time, notifying the nodes to switch to the second consensus mode.

19. The message processing method according to claim 14, further comprising:
switching the nodes to the first consensus mode when a number of times that the nodes reach the consensus on the received message from the client device in the second consensus mode exceeds a first consensus threshold of the leader node.

20. A non-transitory computer-readable storage medium storing a program executable by one or more processors of a client device with a digital signature to perform:
sending a message to be stored in nodes after the nodes reach a consensus on the message, the message including the digital signature of the client device;
obtaining results from a subset of the nodes that receive the message, the results having respective digital signatures of the subset of the nodes, the nodes including a leader node and follower nodes and being in a first consensus mode for reaching the consensus on the message;
after verifying the digital signatures of the subset of the nodes, determining, based on the results, whether one or more of the nodes has malfunctioned; and
based on the one or more of the nodes being determined to be malfunctioned,
triggering the nodes to switch from the first consensus mode to a second consensus mode, the first consensus mode and the second consensus mode corresponding to different consensus algorithms; and
determining a leader node from the nodes for the second consensus mode after the nodes are switched to the second consensus mode.

* * * * *